US005920299A

United States Patent [19]

Ohshima et al.

[11] Patent Number: 5,920,299

[45] Date of Patent: Jul. 6, 1999

[54] COLOR DISPLAY PANEL AND APPARATUS

[75] Inventors: Masamichi Ohshima, Tokyo; Hiroshi Inoue, Yokohama; Shuntaro Aratani, Kawasaki, all of Japan

[73] Assignee: Canon Kabushiki Kaisha, Tokyo, Japan

[21] Appl. No.: 08/772,777

[22] Filed: Dec. 24, 1996

[30] Foreign Application Priority Data

Dec. 28, 1995 [JP] Japan .................................... 7-343091

[51] Int. Cl.$^6$ .................................................. G02F 1/1343

[52] U.S. Cl. ................................ 345/88; 345/84; 345/90; 345/150; 345/152; 349/85; 349/144

[58] Field of Search ................................ 345/63, 72, 77, 345/84, 88, 89, 90, 147, 149, 150, 152, 431, 432; 349/85, 144

[56] References Cited

U.S. PATENT DOCUMENTS

| | | | |
|---|---|---|---|
| 4,655,561 | 4/1987 | Kanbe et al. | 350/350 S |
| 4,791,417 | 12/1988 | Bobak | 340/784 |
| 4,902,103 | 2/1990 | Miyake et al. | 350/336 |
| 5,091,723 | 2/1992 | Kanno et al. | 340/784 |
| 5,124,695 | 6/1992 | Green | 340/784 |
| 5,189,536 | 2/1993 | Hanyu et al. | 359/56 |
| 5,404,236 | 4/1995 | Hartmann et al. | 359/54 |

FOREIGN PATENT DOCUMENTS

| | | |
|---|---|---|
| 0361981 | 4/1990 | European Pat. Off. . |
| 0526135 | 2/1993 | European Pat. Off. . |
| 0 540 294 | 5/1993 | European Pat. Off. . |
| 0671648 | 9/1995 | European Pat. Off. . |
| 0671649 | 9/1995 | European Pat. Off. . |
| 0673012 | 9/1995 | European Pat. Off. . |
| 6-295338 | 10/1994 | Japan . |

*Primary Examiner*—Mark K. Zimmerman
*Assistant Examiner*—Vincent E. Kovalick
*Attorney, Agent, or Firm*—Fitzpatrick, Cella, Harper & Scinto

[57] ABSTRACT

A color display panel has a multiplicity of pixels each including a first color dot composed of a plurality of sub-dots having mutually different areas and a second color dot composed of a plurality of sub-dots having mutually different areas. Each of the first and second color dots includes at least one first sub-dot and at least one second sub-dot having an effective area smaller than that of the first sub-dot. The first or second sub-dot of the second color dot is disposed between the first and second sub-dots of the second color dot. The thus-constituted color display panel allows easy resolution conversion and multi-level gradational display.

44 Claims, 26 Drawing Sheets

| INPUT | OUTPUT a | OUTPUT b |
|---|---|---|
| 0 | 0 | 0 |
| 1 | 0 | 0 |
| 2 | 0 | 0 |
| 3 | 0 | 0 |
| 4 | 0 | 0 |
| 5 | 0 | 1 |
| 6 | 0 | 1 |
| 7 | 0 | 1 |
| 8 | 0 | 1 |
| 9 | 0 | 1 |
| 10 | 1 | 1 |
| 11 | 1 | 1 |
| 12 | 1 | 1 |
| 13 | 1 | 1 |
| 14 | 1 | 1 |
| 15 | 1 | 1 |

SMODE=0

| ADDRESS | S0 | S1 | S2 | S3 | S4 | S5 | S6 | S7 | S8 | S9 | S10 | S11 | · · · | S2300 | S2301 | S2302 | S2303 |
|---|---|---|---|---|---|---|---|---|---|---|---|---|---|---|---|---|---|
| 0 | 1 | 0 | 1 | 0 | 0 | 0 | 0 | 0 | 0 | 0 | 0 | 0 | · · · | 0 | 0 | 0 | 0 |
| 1 | 0 | 1 | 0 | 0 | 0 | 0 | 0 | 0 | 0 | 0 | 0 | 0 | · · · | 0 | 0 | 0 | 0 |
| 2 | 0 | 0 | 0 | 1 | 0 | 1 | 0 | 0 | 0 | 0 | 0 | 0 | · · · | 0 | 0 | 0 | 0 |
| 3 | 0 | 0 | 0 | 0 | 1 | 0 | 0 | 0 | 0 | 0 | 0 | 0 | · · · | 0 | 0 | 0 | 0 |
| 4 | 0 | 0 | 0 | 0 | 0 | 0 | 1 | 0 | 1 | 0 | 0 | 0 | · · · | 0 | 0 | 0 | 0 |
| 5 | 0 | 0 | 0 | 0 | 0 | 0 | 0 | 1 | 0 | 0 | 0 | 0 | · · · | 0 | 0 | 0 | 0 |
| 6 | 0 | 0 | 0 | 0 | 0 | 0 | 0 | 0 | 0 | 1 | 0 | 1 | · · · | 0 | 0 | 0 | 0 |
| 7 | 0 | 0 | 0 | 0 | 0 | 0 | 0 | 0 | 0 | 0 | 1 | 0 | · · · | 0 | 0 | 0 | 0 |
| 8 | 0 | 0 | 0 | 0 | 0 | 0 | 0 | 0 | 0 | 0 | 0 | 0 | · · · | 0 | 0 | 0 | 0 |
| · · · · | | | | | | · · · · | | | | | | | | | | · · · · | |
| 1533 | 0 | 0 | 0 | 0 | 0 | 0 | 0 | 0 | 0 | 0 | 0 | 0 | · · · | 1 | 0 | 0 | 0 |
| 1534 | 0 | 0 | 0 | 0 | 0 | 0 | 0 | 0 | 0 | 0 | 0 | 0 | · · · | 0 | 1 | 0 | 1 |
| 1535 | 0 | 0 | 0 | 0 | 0 | 0 | 0 | 0 | 0 | 0 | 0 | 0 | · · · | 0 | 0 | 1 | 0 |

FIG. 20A

SMODE=1

| ADDRESS | S0 | S1 | S2 | S3 | S4 | S5 | S6 | S7 | S8 | S9 | S10 | S11 | . . . | S2300 | S2301 | S2302 | S2303 |
|---|---|---|---|---|---|---|---|---|---|---|---|---|---|---|---|---|---|
| 0 | 1 | 1 | 1 | 1 | 0 | 0 | 0 | 0 | 0 | 0 | 0 | 0 | . . . | 0 | 0 | 0 | 0 |
| 1 | 0 | 0 | 0 | 0 | 1 | 1 | 1 | 1 | 0 | 0 | 0 | 0 | . . . | 0 | 0 | 0 | 0 |
| 2 | 0 | 0 | 0 | 0 | 0 | 0 | 0 | 0 | 1 | 1 | 1 | 1 | . . . | 0 | 0 | 0 | 0 |
| 3 | 0 | 0 | 0 | 0 | 0 | 0 | 0 | 0 | 0 | 0 | 0 | 0 | . . . | 0 | 0 | 0 | 0 |
| 4 | 0 | 0 | 0 | 0 | 0 | 0 | 0 | 0 | 0 | 0 | 0 | 0 | . . . | 0 | 0 | 0 | 0 |
| 5 | 0 | 0 | 0 | 0 | 0 | 0 | 0 | 0 | 0 | 0 | 0 | 0 | . . . | 0 | 0 | 0 | 0 |
| 6 | 0 | 0 | 0 | 0 | 0 | 0 | 0 | 0 | 0 | 0 | 0 | 0 | . . . | 0 | 0 | 0 | 0 |
| 7 | 0 | 0 | 0 | 0 | 0 | 0 | 0 | 0 | 0 | 0 | 0 | 0 | . . . | 0 | 0 | 0 | 0 |
| 8 | 0 | 0 | 0 | 0 | 0 | 0 | 0 | 0 | 0 | 0 | 0 | 0 | . . . | 0 | 0 | 0 | 0 |
| . . . . | | | | | | . . . . | | | | | | | | | | . . . . | |
| 573 | 0 | 0 | 0 | 0 | 0 | 0 | 0 | 0 | 0 | 0 | 0 | 0 | . . . | 0 | 0 | 0 | 0 |
| 574 | 0 | 0 | 0 | 0 | 0 | 0 | 0 | 0 | 0 | 0 | 0 | 0 | . . . | 0 | 0 | 0 | 0 |
| 575 | 0 | 0 | 0 | 0 | 0 | 0 | 0 | 0 | 0 | 0 | 0 | 0 | . . . | 1 | 1 | 1 | 1 |

FIG. 20B

SMODE=2

| ADDRESS | S0 | S1 | S2 | S3 | S4 | S5 | S6 | S7 | S8 | S9 | S10 | S11 | · | · | · | S2300 | S2301 | S2302 | S2303 |
|---|---|---|---|---|---|---|---|---|---|---|---|---|---|---|---|---|---|---|---|
| 0 | 1 | 1 | 0 | 0 | 0 | 0 | 0 | 0 | 0 | 0 | 0 | 0 | · | · | · | 0 | 0 | 0 | 0 |
| 1 | 0 | 0 | 1 | 1 | 0 | 0 | 0 | 0 | 0 | 0 | 0 | 0 | · | · | · | 0 | 0 | 0 | 0 |
| 2 | 0 | 0 | 0 | 0 | 1 | 1 | 0 | 0 | 0 | 0 | 0 | 0 | · | · | · | 0 | 0 | 0 | 0 |
| 3 | 0 | 0 | 0 | 0 | 0 | 0 | 1 | 1 | 0 | 0 | 0 | 0 | · | · | · | 0 | 0 | 0 | 0 |
| 4 | 0 | 0 | 0 | 0 | 0 | 0 | 0 | 0 | 1 | 1 | 0 | 0 | · | · | · | 0 | 0 | 0 | 0 |
| 5 | 0 | 0 | 0 | 0 | 0 | 0 | 0 | 0 | 0 | 0 | 1 | 1 | · | · | · | 0 | 0 | 0 | 0 |
| 6 | 0 | 0 | 0 | 0 | 0 | 0 | 0 | 0 | 0 | 0 | 0 | 0 | · | · | · | 0 | 0 | 0 | 0 |
| 7 | 0 | 0 | 0 | 0 | 0 | 0 | 0 | 0 | 0 | 0 | 0 | 0 | · | · | · | 0 | 0 | 0 | 0 |
| 8 | 0 | 0 | 0 | 0 | 0 | 0 | 0 | 0 | 0 | 0 | 0 | 0 | · | · | · | 0 | 0 | 0 | 0 |
| · · · · | | | | | | · · · · | | | | | | | | | | | · · · · | | |
| 1149 | 0 | 0 | 0 | 0 | 0 | 0 | 0 | 0 | 0 | 0 | 0 | 0 | · | · | · | 0 | 0 | 0 | 0 |
| 1150 | 0 | 0 | 0 | 0 | 0 | 0 | 0 | 0 | 0 | 0 | 0 | 0 | · | · | · | 1 | 1 | 0 | 0 |
| 1151 | 0 | 0 | 0 | 0 | 0 | 0 | 0 | 0 | 0 | 0 | 0 | 0 | · | · | · | 0 | 0 | 1 | 1 |

FIG. 21

FIG. 25A B=0
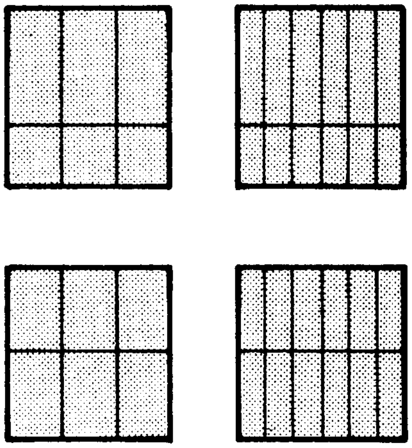
FIG. 25B B=1
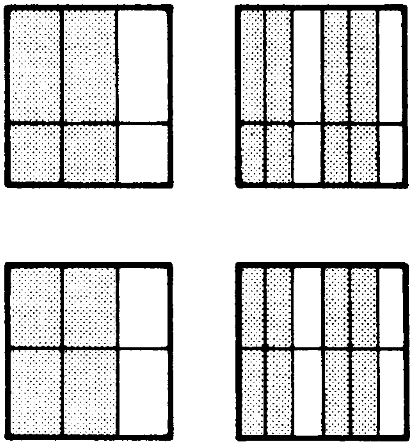

G=0

G=1

G=2

COLOR DISPLAY PANEL AND APPARATUS

FIELD OF THE INVENTION AND RELATED ART

The present invention relates to a display panel used in a display for data processing systems, such as a computer, a word processor, a television receiver, and a car navigation system; a view finder for a video camera; a light valve for a projector, etc.; particularly a color display panel and display apparatus including such a color display panel.

In case of displaying a picture or image of a lower resolution by using a dot matrix-type display panel having a fixed resolution, i.e., a fixed number of pixels, it has been practiced to display the lower resolution picture in a part of the display area of the display panel while leaving the remaining region as a non-display region.

On the other hand, in case of displaying an image of a resolution higher than a prescribed resolution of a display panel, it has been practiced to display a portion of the image to be displayed over the entire region of the display panel (virtual screen). In this case, it is impossible to simultaneously display an entire image on the display panel (First scheme).

We have proposed a scheme (Second scheme) wherein the image data is thinned out and then enlarged, thereby conforming the enlarged image size to that of the display panel size (JP-A 5-1197374, EP-A 0540294). However, a further improvement is required in order to prevent the blurring of a display image and remove a non-naturalness caused by the thinning-out of image data.

Further, JP-A 6-295338 has disclosed an image data processing scheme without including thinning-out of image data (Third scheme).

According to the above-mentioned First scheme, it is impossible to simultaneously display an entire picture on a display panel.

According to the Second scheme, a portion of picture data is lost due to the thinning-out.

The Third scheme involves complicated data processing or operation, so that a complicated and large-scale picture processing circuit is required to obstruct the provision of an inexpensive apparatus.

SUMMARY OF THE INVENTION

In view of the above-mentioned problems, an object of the present invention is to provide a color display panel allowing easy picture data processing, a multi-level gradational display by using sub-dots and further providing an inexpensive display apparatus.

Another object of the present invention is to provide a color display panel and a color display apparatus capable of preventing blurring of display images and change in thickness of characters and lines.

Another object of the present invention is to provide a color display panel and a color display apparatus little liable to be affected by noise (jitter) of input signals.

A further object of the present invention is to provide a color display panel and a color display apparatus capable of a multi-level gradational display at a standard display mode and also adaptable to a high-resolution display mode.

As a result of a large number of experiments and trial and errors, we have traversed a conventional concept that a picture data processing circuit is in charge of resolution conversion for enlargement or reduction and arrived at a concept that a display panel is in charge of the resolution conversion. Then, this concept has been reduced into practice by using a display panel having a unique dot (pixel) pattern.

According to the present invention, there is provided a color display panel, comprising: a multiplicity of pixels each comprising a first color dot comprising a plurality of sub-dots having mutually different areas and a second color dot comprising a plurality of sub-dots having mutually different areas; wherein each of the first and second color dots comprises at least one first sub-dot and at least one second sub-dot having an effective area smaller than that of the first sub-dot, and the first or second sub-dot of the second color dot is disposed between the first and second sub-dots of the first color dot.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 20A, 20B and 21 respectively show a logic table for illustrating a decoder operation depending on a display mode in the First embodiment.

FIGS. 25A–25B and FIGS. 27A–27C illustrate manners of gradational display at the gradations shown in FIG. 24 and FIG. 26, respectively.

DESCRIPTION OF THE PREFERRED EMBODIMENTS

Figure 1:
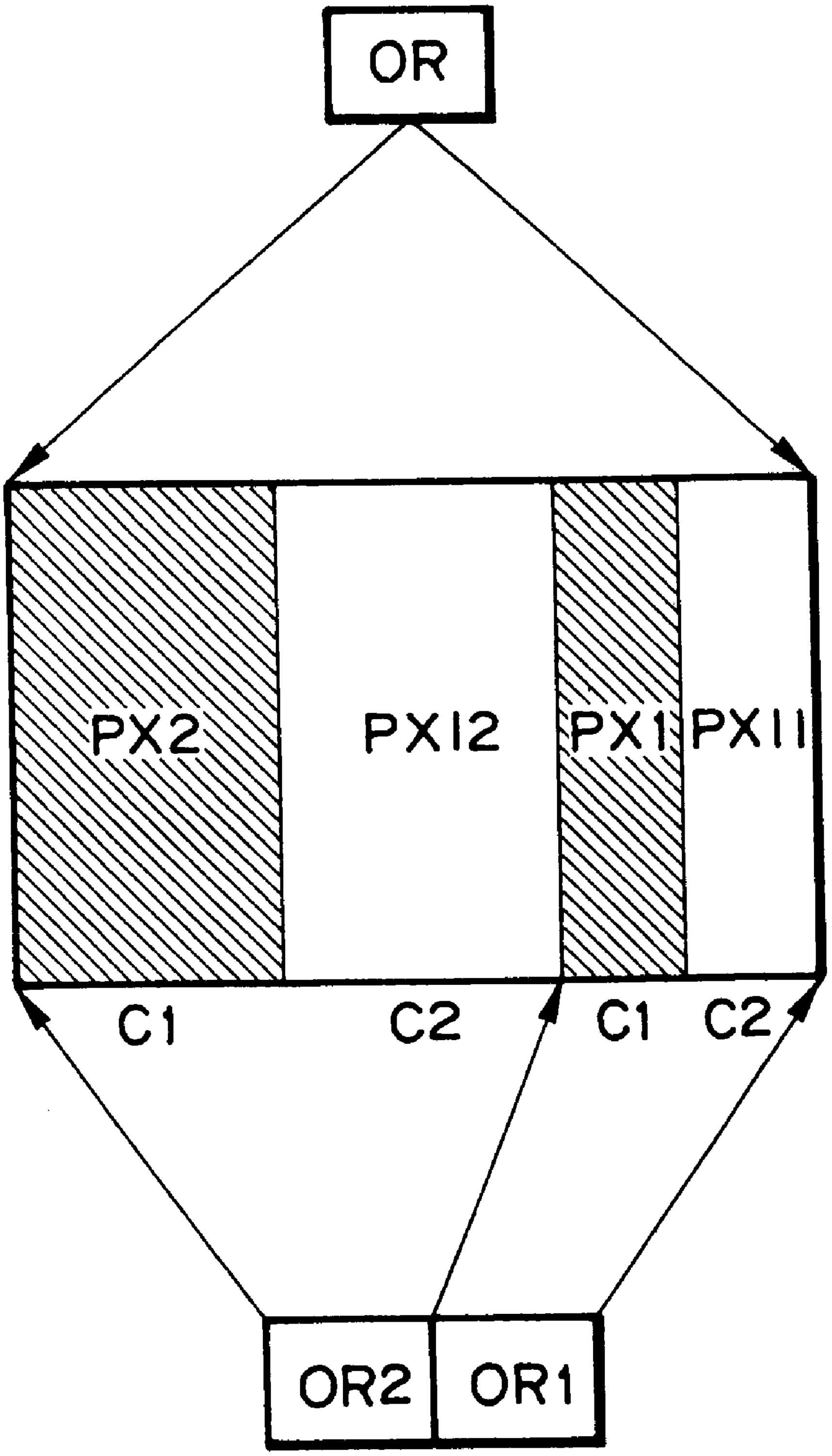
FIG. 1 is an explanatory view for illustrating a dot arrangement and a manner of resolution conversion in a color display panel according to a preferred embodiment of the invention.

FIG. 1 is an explanatory view for illustrating a partial pixel arrangement in a display panel according to a preferred embodiment of the present invention.

[Dot pattern]

A display panel used in the present invention has a dot pattern (or pixel pattern) as described hereinbelow.

FIG. 1 illustrates one pixel of a display panel and a manner of resolution conversion according to an embodiment of the present invention.

Referring to FIG. 1, OR represents data for one pixel among original image data, and PX1 represents a first sub-dot of a first color, PX2 represents a second sub-dot of the first color, which sub-dots have mutually different areas and can be independently turned on or off.

Similarly, for a second color, one pixel is divided into a first sub-dot PX11 and a second sub-dot PX12, which are alternately arranged with the sub-dots of the first color.

In the case of a low-resolution display mode, one-pixel data among the original picture data is allotted to the whole sub-dots, so that the sub-dots PX1 and PX2 are both turned on or off, and also the sub-dots PX11 and PX12 are both turned on or off.

In the case of a gradational (or gray scale) display, however, the sub-dots may be independently turned on or off corresponding to the gradational level of the one pixel data OR so as to effect a four-gradation level display.

On the other hand, in the case of a high-resolution display mode, data for two pixels in the original picture is allotted to the pixel (4 sub-dots) shown in FIG. 1. In other words, first pixel data OR1 in the original picture is allotted to the sub-dots PX1 and PX11, and second pixel data OR2 is allotted to the sub-dots PX2 and PX12.

Accordingly, a standard display mode may be set to the low-resolution display mode for effecting a multi-color display of multi-gradation levels, and the color display panel may be driven according to the above-mentioned high-resolution display mode in case where a high-resolution display is required by all means even if the pixel size is changed or the number of displayable gradation levels is reduced thereby.

It is also possible to dispose the sub-dot PX11 on the right side of the sub-dot PX2, and the sub-dot PX12 on the right side of the sub-dot PX1. At this time, for the high-resolution display mode, the first pixel data OR1 is allotted to the sub-dots PX1 and PX12, and the second pixel data OR2 is allotted to the sub-dots PX2 and PX11. In this case, color balance becomes different between two pixels for high-resolution display, but the difference in pixel size is removed or suppressed.

Figure 2A:
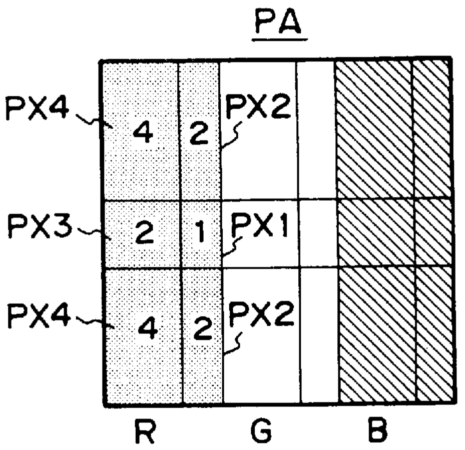
FIGS. 2A–2C are schematic views for illustrating pixel dot patterns in a color display panel according to the invention.
Figure 2B:
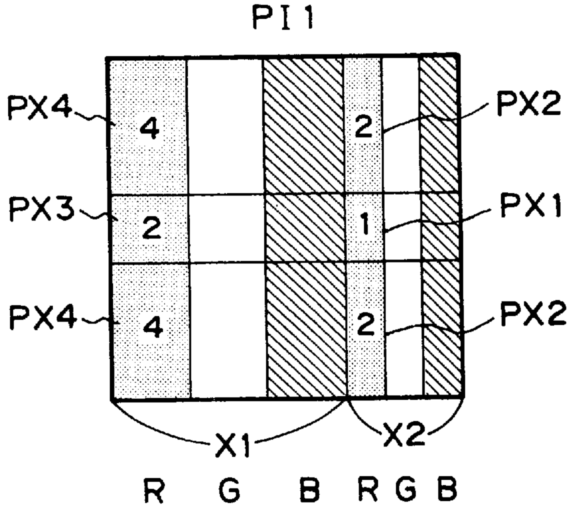

FIG. 2B shows one color pixel PI1 having another basic pattern according to the present invention, including red (R), green (G) and blue (B) sub-dots.

Sub-dots of the red (R) as a first color are first described.

On a left-side first column, three R sub-dots PX3 and PX4 are disposed, of which the two sub-dots PX4 are scanned to be turned on or off simultaneously.

On a right-side second column separated by columns of other color sub-dots, three R sub-dots PX1 and PX2 are disposed, of which the two sub-dots PX2 are simultaneously turned on or off. Numerals (such as 4, 2 and 1) in the figure refer to relative effective areas of the respective sub-dots.

Similarly, G and B sub-dots are respectively disposed in two columns.

In case of operation in a high-resolution display mode, one pixel data among original picture data is supplied to only the sub-dots PX3 and PX4 in the first column for each color, and the sub-dots PX1 and PX2 having smaller effective areas are supplied with data for another one pixel among the original picture data.

Accordingly, in the high-resolution display mode, (sub-) pixel X1 and X2 of the pixel PI1 in FIG. 2B display the data for two pixels among the original image data.

On the other hand, in a low-resolution display mode, the sub-pixels X1 and X2 of the pixel PI1 in FIG. 2B display one pixel data among the original image, whereas 2 columns of sub-lots are used for display of each color, so that 16 levels of gradational display may be effected according to various combinations of on- and off-states of the sub-dots PX1, PX2, PX3 and PX4.

Figure 2C:
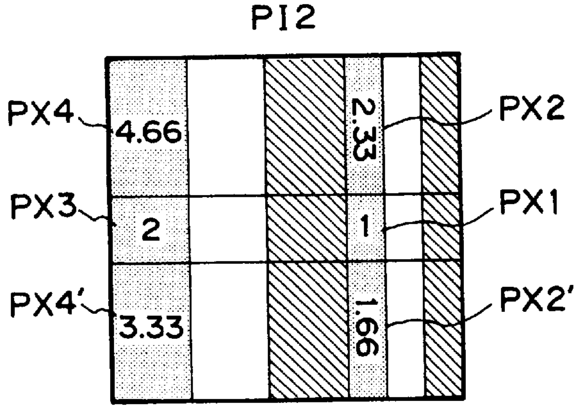

FIG. 2C shows a pixel PI2 which has a similar sub-dot arrangement but different sub-dot areal ratios for sub-dots PX2 (and PX2') and PX4 (and PX4') compared with those in the pixel PI1 in FIG. 2C.

The pattern of pixel (dot) PI2 shown in FIG. 2C exhibits an effect that the respective pixels have equal areas even under different resolutions by arranging the pixel pattern in a number of 4 in two rows and two columns in a mirror symmetry vertically and horizontally and arranging the four pixels two-dimensionally. Details thereof will be described in Example 1 described hereinafter.

FIG. 2A shows a pattern of pixel PA which is outside the present invention.

According to this pixel pattern PA wherein sub-dots (PX1–PX4) of each color are disposed adjacent to each other without via sub-dots of other colors, it is impossible to effect the above-mentioned spatial division of a pixel according to the high-resolution display mode.

Figure 3:
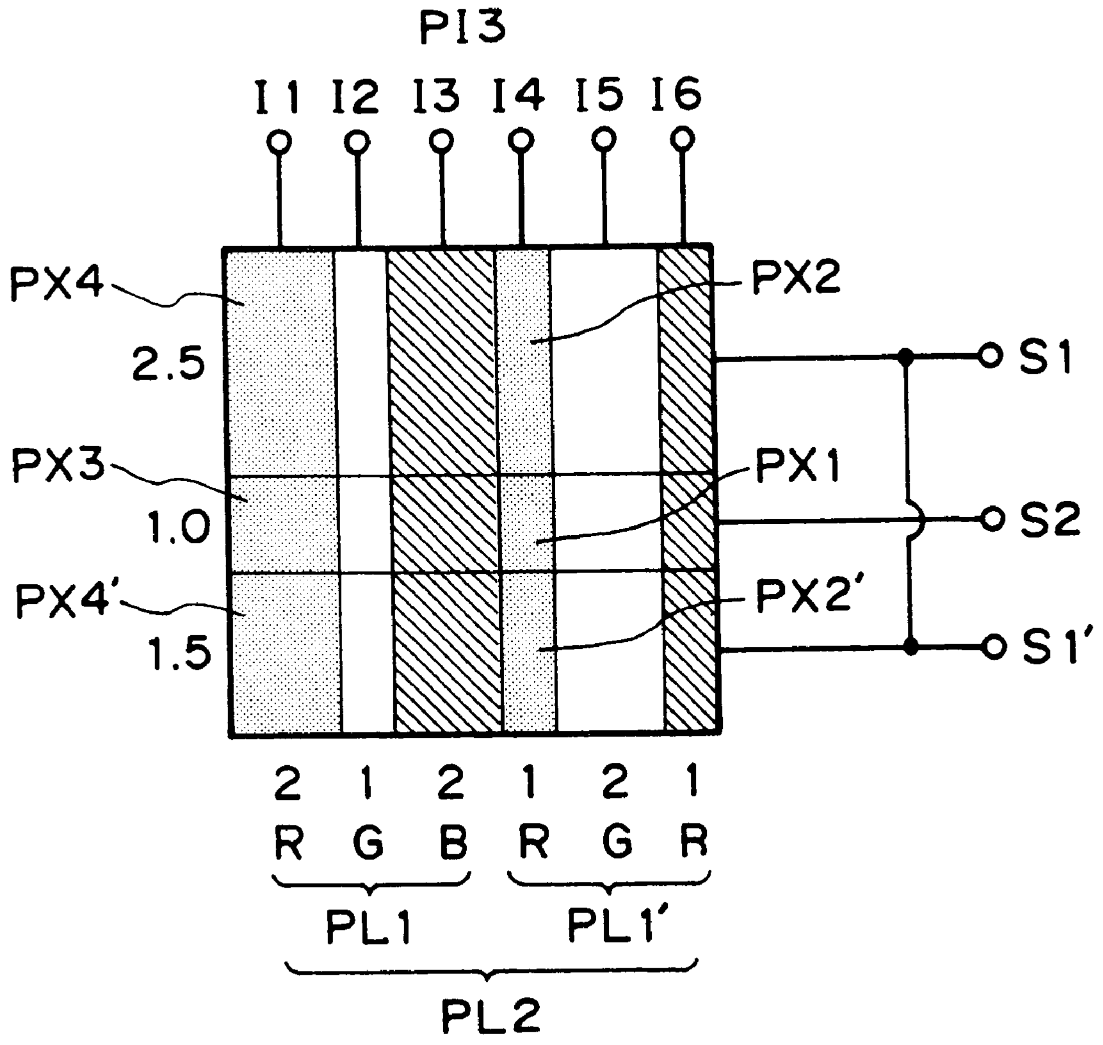
FIG. 3 is a schematic view for illustrating another dot pattern in a color display panel according to the invention.

FIG. 3 shows a pattern of pixel PI3 having a different order of sub-dot columns. If it is assumed that a first column of sub-dot has a larger effective area and a second column of sub-dot has a smaller effective area for each color, the pixel PI3 includes sub-dots of first column R, second column G, first column B, second column R, first column G and second column B in order from the left to the right.

The pixel PI3 is divided into two pixels PL1 and PL1' for display in a high-resolution mode and driven for display as one pixel PL2 in a low-resolution mode.

In the high-resolution display mode, the pixels PL1 and PL1' show a difference in color balance, so that it is more appropriate to set the low-resolution display mode giving a uniform color balance over the entire pixels as a standard display mode.

A further degree of gradational display may be performed by turning on or off the respective sub-dots independently.

It is preferred to allot the sub-dots to an electrode matrix composed of scanning lines and data lines in a manner as shown in FIG. 3. More specifically, on a scanning line S1, sub-dots PX2 and PX4 of each color having an area of 2.5 or 5.0 are disposed. On an adjacent scanning line S2, sub-dots PX1 and PX3 of each color having an area of 1.0 or 2.0 are disposed. Similarly, on a scanning line S1', sub-dots PX2' and PX4' having an area of 1.5 or 3.0 are disposed.

On the other hand, 6 data line I1–I6 may be allotted to sub-dot columns of respective colors separately.

If scanning line S1 and S1' are short-circuited as shown, sub-dots PX2, PX4 and sub-dots PX2', PX4' are simultaneously selected, so that sub-dot PX2 and PX2' or sub-dots PX4 and PX4' are caused to assume a common display state.

A different color order may be accomplished by arranging sub-dots in the order of first column R, second column B, first column G, second column R, first column B and second columns G from the left to the right. Another color order may be attained by arranging sub-dots in the order of first column G, second column R, first column B, second column G, first column R and second column B from the left to the right in FIG. 3.

The pixel PI3 pattern shown in FIG. 3 may be further modified so that second column sub-dots having a smaller effective area are disposed on a left side and a right side in the pixel PL1, and also first column sub-dots having a larger effective area are disposed on a left or right side.

Figure 4:
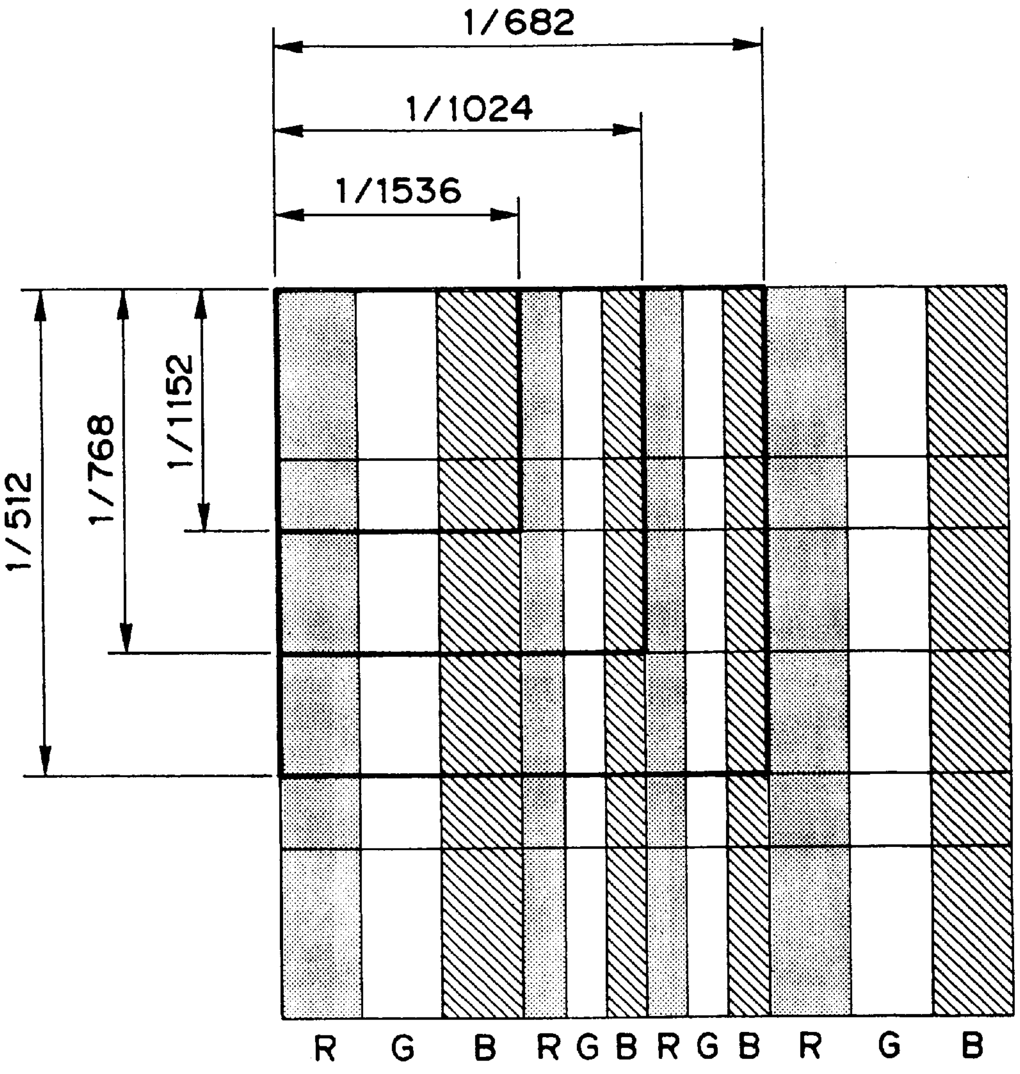
FIGS. 4 and 5 respectively illustrate another dot pattern in a color display panel according to the invention.

FIG. 4 shows a pattern of four pixels formed by arranging the pixel PI2 shown in FIG. 2C vertically and horizontally in mirror symmetries.

In a high-resolution display mode, a rectangular pixel having a side length of 1/1536 and another side length 1/1152 is supplied with one pixel data of original picture. Further, a pixel in sizes of 1/1024 and 1/768 is supplied with one pixel data of the original picture in a medium-resolution display mode, and a pixel in sizes of 1/682 and 1/512 is supplied with one pixel data of the original picture in a low-resolution display mode.

In this embodiment, a high-resolution (or low-resolution) pixel and a medium-resolution pixel do not have effective areas giving a ratio of $2^n$ wherein n is an integer.

Figure 5:
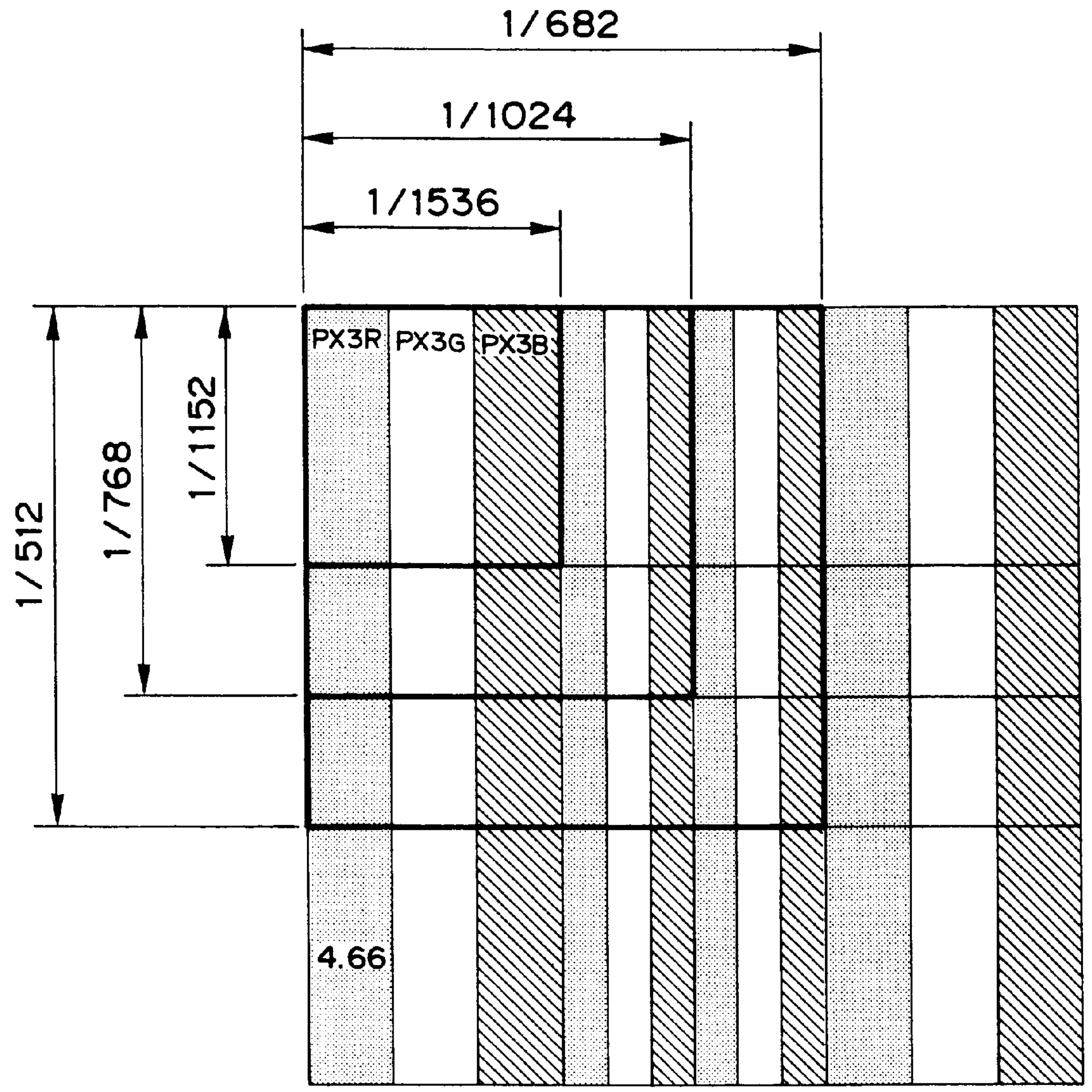

FIG. 5 is a modification of FIG. 4, showing an embodiment wherein each color dot in a high-resolution mode is not divided into sub-dots.

[Display panel]

The display panel used in the present invention may for example be in the form of an electrochromic display panel, a liquid crystal display panel, a plasma display panel, an FED (field emission display) panel having electron emission sources, a DMD (digital micromirror device) panel, or a panel having a light-emission device array such as an array of LEDs.

Among these, a liquid crystal display panel is advantageous in view of features, such as a relatively small power consumption, and easiness for providing a panel of a small-size, light weight and/or large area, and may be embodied as a simple matrix-type, a TFT-active matrix-type or an MIM-type. Particularly, a simple matrix-type panel using a chiral smectic liquid crystal forming a ferroelectric or anti-ferroelectric liquid crystal may be advantageously adopted in the present invention because of easiness for providing a large area and/or a high resolution panel. The liquid crystal panel suitably used in the present invention may have a structure similar to that adopted in a ferroelectric liquid crystal display panel as described in detail in, e.g., U.S. Pat. Nos. 4,655,561; 5,091,723; and 5,189,536.

The present invention is also suitably applicable to a liquid crystal display panel using a bistable twisted-nematic (BTN) liquid crystal as disclosed in "Processing of the 15th International Display Research Conference, October 1995", pp. 259–262. The BTN-liquid crystal assumes two meta-stable states, which are used for displaying bright and dark states to effect in image display.

The effective area of a (sub-)dot used in a panel in the present invention may for example be defined as an area of a portion at which a scanning electrode and a data electrode are opposite to each other in a simple matrix-type liquid crystal display panel, or an area of a portion where a common electrode and a pixel electrode (drain electrode) are opposite to each other in an active matrix-type panel. Not restricted to those in such panels, the dot effective area adopted in the present invention can also be an area of a portion defined by a light-shielding member, such as a black matrix. The effective dot area may also be defined as an area of a portion provided with a light-emitting material such as a fluorescent material in the case of a plasma display panel or an FED panel, and may also be defined as an area of a micro-mirror.

[Gradational display]

In the display panel of the present invention, a halftone picture can be displayed by data processing of picture data signals carrying gradation data. This may be effected by modulating at least one of a voltage and a pulse width applied to an optical modulation element such as a liquid crystal, an electron source or a mirror, of a pixel depending on gradation data. More specifically, in the case of a display panel using a TN-liquid crystal, the voltage applied to the liquid crystal at the respective pixels may be modulated depending on given gradation data.

In a display panel of the present invention, it is more suitable to adopt an areal gradational display scheme wherein a prescribed dot is further divided into a plurality of dots (sub-dots) so as to form a bright-state dot and a dark-state dot in a pixel to effect a luminance modulation.

An example of such a dot division scheme is disclosed in EP-A 0671648.

In the present invention, the areal ratios among the sub-dots may preferably be adjusted so that such a dot division for gradational display is applicable at a prescribed resolution level.

[Color display]

In the present invention, color display may be performed by using plural colors of color-generating materials in the case of spontaneous light-emission-type display panel or by providing color filters in the case of a type of display panel controlling the transmittance or reflectance thereby. The colors of the color-generating material or the filters may be three primary colors of red (R), green (G) and blue (B) or complementary colors of yellow (Y), magenta (M) and cyan (C), or other colors or combinations thereof, e.g., in a special case of reproducing specific colors. It is also possible to further provide non-colored pixels in order to provide an enhanced luminance of white. The present invention may particularly suitably be applicable to a display panel using a color filter, and each dot may have a planar shape and an effective area determined by respective color segments of the color filter and a light-intercepting or partitioning member, such as a black matrix.

[Drive]

Figure 6:
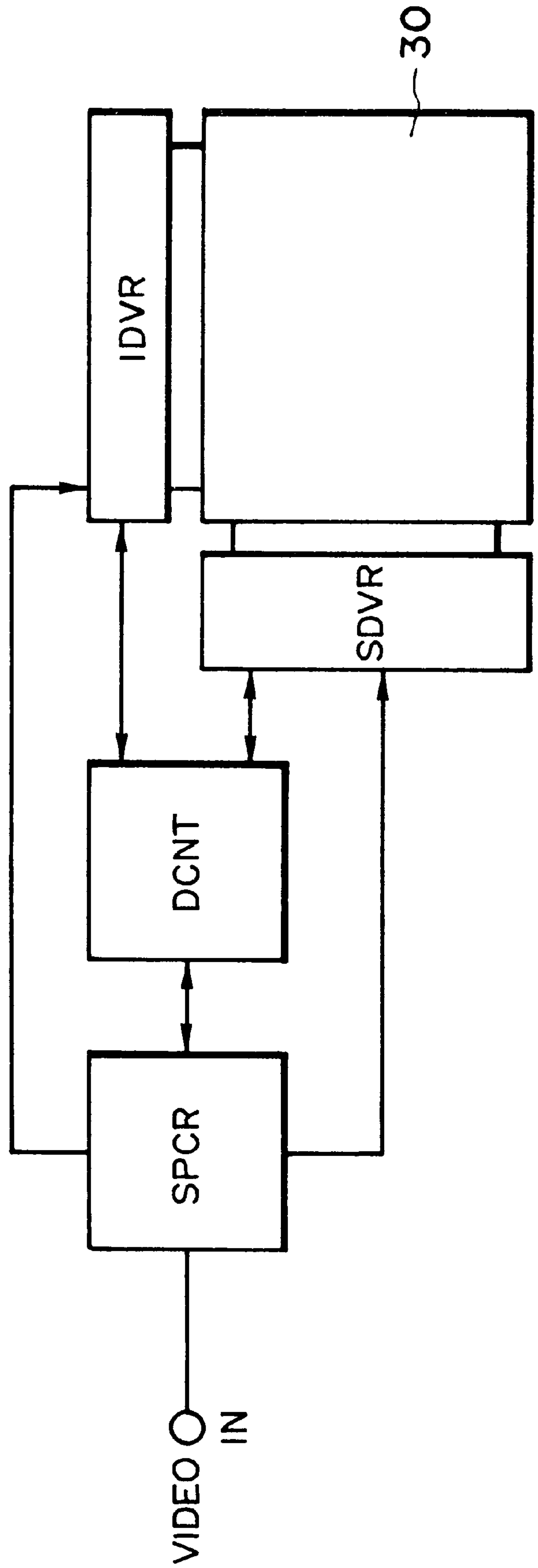
FIG. 6 is a block diagram of a display apparatus according to a preferred embodiment of the invention.

FIG. 6 is a block diagram of a display apparatus including a drive control apparatus according to the present invention. Referring to FIG. 6, the display apparatus includes a display panel 30 having an organization as described above, a data line drive means IDVR for supplying signals to data lines of the display panel 30 and a scanning line drive means SDVR for supplying signals to scanning lines of the display panel 30. These drive means are controlled by a drive control means DCNT and receive signals corresponding to image data to be displayed from a signal processing means SPCR.

Image data (video data) inputted from an input terminal IN is subjected to detection of a display resolution level and conversion into signals corresponding to the respective dots of the display panel. The converted signals are inputted to the drive means IDVR and SDVR. The drive means IDVR and SDVR generate voltage pulses suitable for driving the display panel depending on the inputted signals and supply the voltage pulses to the scanning lines and the data lines.

The drive means IDVR may desirably be provided with a shift register function, a memory function and a switch function for determining a pulse width.

The drive means SDVR may desirably be provided with a decoder function and a switch function for determining a pulse width, and can also be equipped with a memory or an address detection circuit as desired.

The signal processing means may be required to have a detection function for detecting a resolution level to be displayed and a function of taking a correspondence or concordance between original data and respective dots of the display panel depending on the detected resolution level. In case where the resolution data is inputted together with the image data in advance, the concordance may be performed depending thereon.

EMBODIMENTS

Hereinbelow, some specific embodiments of the present invention will be described. It should be however noted that the present invention is not restricted to such specific embodiments and respective components may be replaced by substitutes or equivalents for accomplishing the object of the present invention within the scope of the present invention.

First Embodiment

A display apparatus according to the First embodiment includes a resolution detection circuit for detecting vertical and horizontal resolutions of inputted picture signals; a picture conversion circuit for converting inputted data into picture data suitable for writing into pixels on scanning lines and adapted to switching between plural conversion methods; a scanning line selection circuit for selecting a scanning line to be scanned and adapted to switching between plural selection modes; a display panel comprising an electrode matrix formed by a multiplicity of electrodes having a plurality of widths forming specified ratios so as to provide a multiplicity of sub-pixels having a plurality of different areas depending on the electrode widths so that a first plurality of sub-pixels constitutes a first pixel capable of displaying a plurality of gradation levels based on a combination of on-state and off-state of the first plurality of sub-pixels in response to a first resolution mode detected by the resolution detection circuit and a second pixel having a size different from that of the first pixel is constituted by a second plurality of sub-pixels including a portion of the first plurality of sub-pixels or a total of the first plurality of sub-pixels in the first pixel and a portion of the first plurality of sub-pixels in an adjacent first pixel in response to a second resolution mode detected by the resolution detection circuit; and control means for controlling a conversion scheme of the picture conversion circuit and a selection scheme of the scanning line selection scheme; whereby the display panel provides a display resolution which varies in a ratio of, e.g., n or 1/n (n: an integer) depending on a picture resolution mode outputted from a personal computer, thereby providing a display picture having a size equal to or close to that of the entire picture area of the display panel in response to a plurality of resolution modes.

Figure 7:
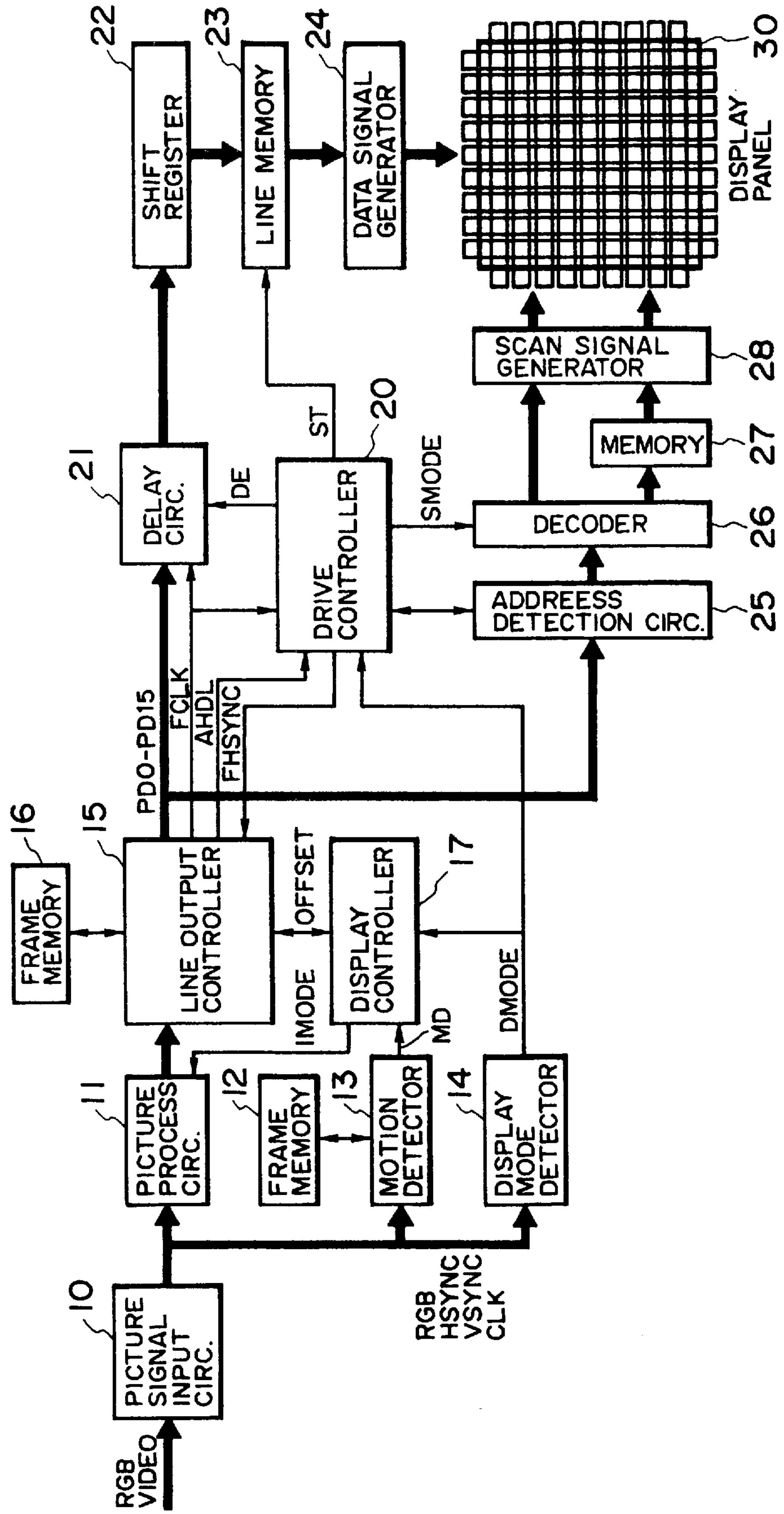
FIG. 7 is a block diagram of a display apparatus according to a First embodiment of the invention.

FIG. 7 is a block diagram of an entire system constituting a display apparatus according to this embodiment. Referring to FIG. 7, the system includes a picture signal input circuit 10 for receiving picture signals from an external data supply, such as a computer or a work station, and generating digital R, G and B signals (RGE), a horizontal synchronizing signal (HSYNC), a vertical synchronizing signal (VSYNC), and pixel clock pulses (CLK); a picture processing circuit 11 for converting the digital RGB signals into picture data for writing into pixels on the scanning lines of a display panel described hereinafter; a frame memory 12 for storing picture data for a previous frame; a motion detection circuit 13 for detecting a certain line on a picture where rewriting has occurred and supplying a detected signal to a display controller 17; a display mode detection circuit 14 for judging vertical and horizontal resolutions of picture data and transmitting a display mode (DMODE) to the display controller 17 and a drive control circuit 20; a line output control circuit 15 for storing data outputted from the picture processing circuit 11 at a frame memory 16 and reading data for one line out of the frame memory 16 to output picture data (PD0–15); and the display controller 17 composed of a microcomputer.

The system further includes a drive control circuit 20 composed of a one-chip micro-computer, a delay circuit 21 for delaying transfer of picture data for writing into pixels on scanning lines, a shift register 22 for serial-parallel conversion of picture data, a line memory 23 for storing picture data for writing into pixels on one scanning line; a data signal generating circuit 24 for generating drive waveform voltages based on picture data, an address detection circuit 25 for detecting address data for designating a scanning line, a decoder 26 for decoding scanning line address data detected by the address detection circuit 25 and designating a scanning line to be selected, a memory 27 for storing designated scanning line data, a scanning signal generating circuit 28 for generating drive waveform voltages so as to drive designated scanning lines based on designated scanning line data from the decoder 26 and the memory 27, and a display panel 30 comprising an electrode matrix composed of scanning lines and data lines and a ferroelectric liquid crystal.

Figure 8:
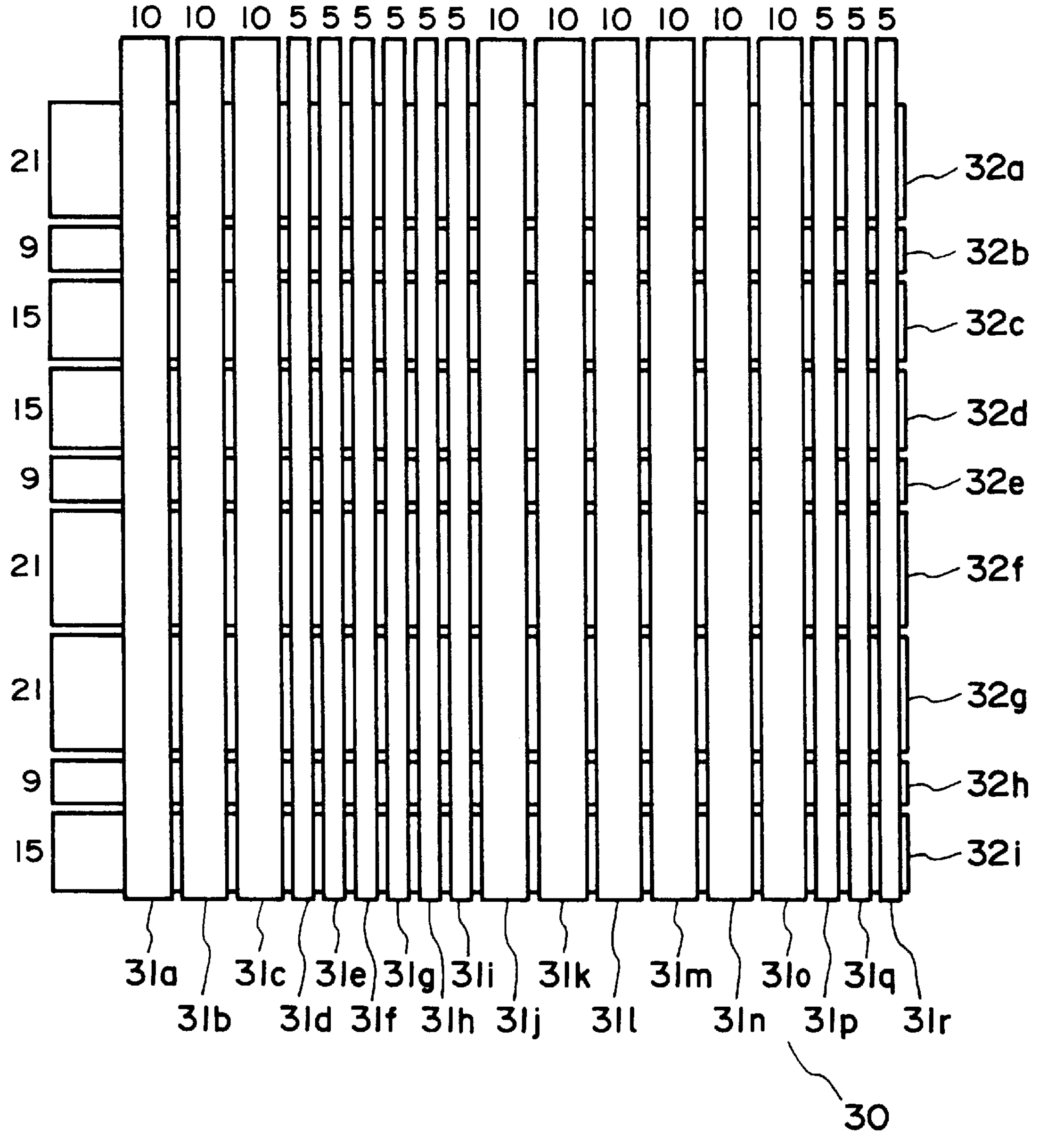
FIG. 8 is a schematic view illustrating an electrode matrix of a display panel used in the First embodiment.

FIG. 8 is a schematic plan view for illustrating an organization of an electrode matrix constituting the display panel 30. The display panel 30 includes data lines (electrodes) 31*a*–31*r* and scanning lines (electrodes) 32*a*–32*i*. Numerals shown above the respective data electrodes and on the left side of the scanning electrodes represent relative electrode widths, respectively. The data electrodes have been set to have relative widths in the order of 10:10:10:5:5:5:5:5:5:10:10:10 . . . successively from the left side, and the scanning electrodes have been set to have relative widths in the order of 21:9:15:15:9:21 . . . successively from the upper end.

Figure 9:
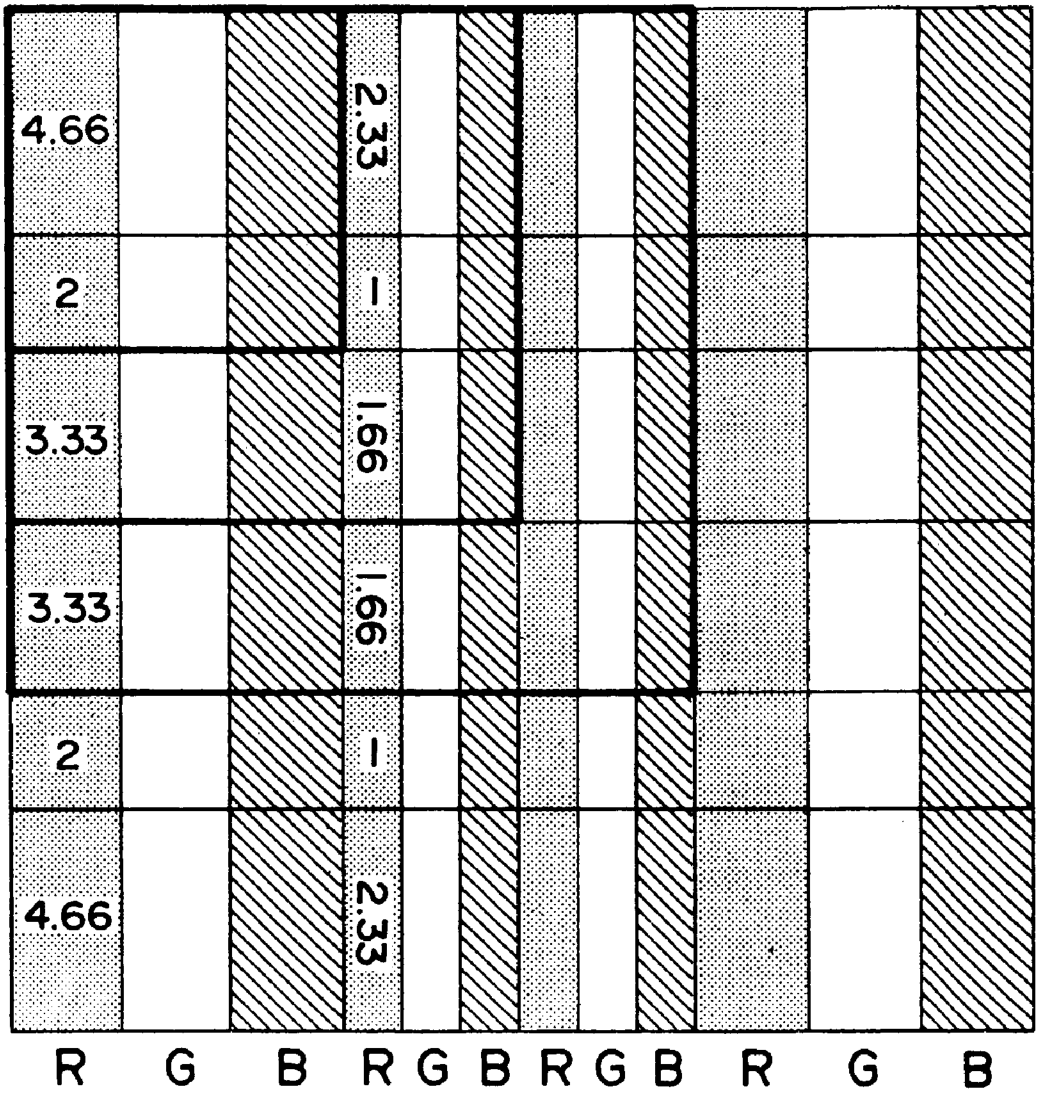
FIG. 9 is a partial pixel arrangement in the display panel used in the First embodiment.

FIG. 9 illustrates a manner of disposition of RGB color filters on a region of the display panel shown in FIG. 8. Stripe-shaped color filters are disposed on the respective data electrodes in the order from the left of RGBRGBRGB . . . Numerals in FIG. 9 represent relative areas of regions defined by overlapping of the respective data electrodes and the respective scanning electrodes. The regions may be called (sub-)dots. Gaps between the (sub-) dots may be masked by a light-intercepting member.

Hereinbelow, the operation of this display apparatus will be described with references to FIG. 7.

(Picture signal input circuit)

The picture signal input circuit 10 having received RGC video data (picture data) from a computer or a work station outputs RGB digital signals, timing signals (horizontal synchronizing signal HSYNC, vertical synchronizing signal VSYNC, pixel clock pulses CLK) to the picture processing circuit 11, the motion detection circuit 13, and the disp ay mode detection circuit 14.

(Motion detection circuit)

On receiving the RGB digital signals according to the timing signals, the motion detection circuit 13 simultaneously reads out picture data for a previous frame stored in the frame memory 12 and compares the data for each pixel. In case where a certain pixel on a certain horizontal line (scanning line) shows a picture data difference between the previous frame data and the current frame data exceeding a prescribed “threshold, the number of the scanning line is outputted as a motion detection signal (MD) to the display controller 17.

(Display mode detection circuit)

The display mode detection circuit 14 detects vertical and horizontal resolution data from the timing signals (HSYNC, VSYNC, CLK) and supply the resolution data as display mode data (DMODE) to the display controller 17 and the drive control circuit 20.

(Picture processing circuit)

The picture processing circuit 11 as a signal processing means in the present invention receives the RGB digital signals as 4-bit data for each of RGB and converts the signals to picture data for writing into pixels on scanning lines of the display panel.

Figure 10A:
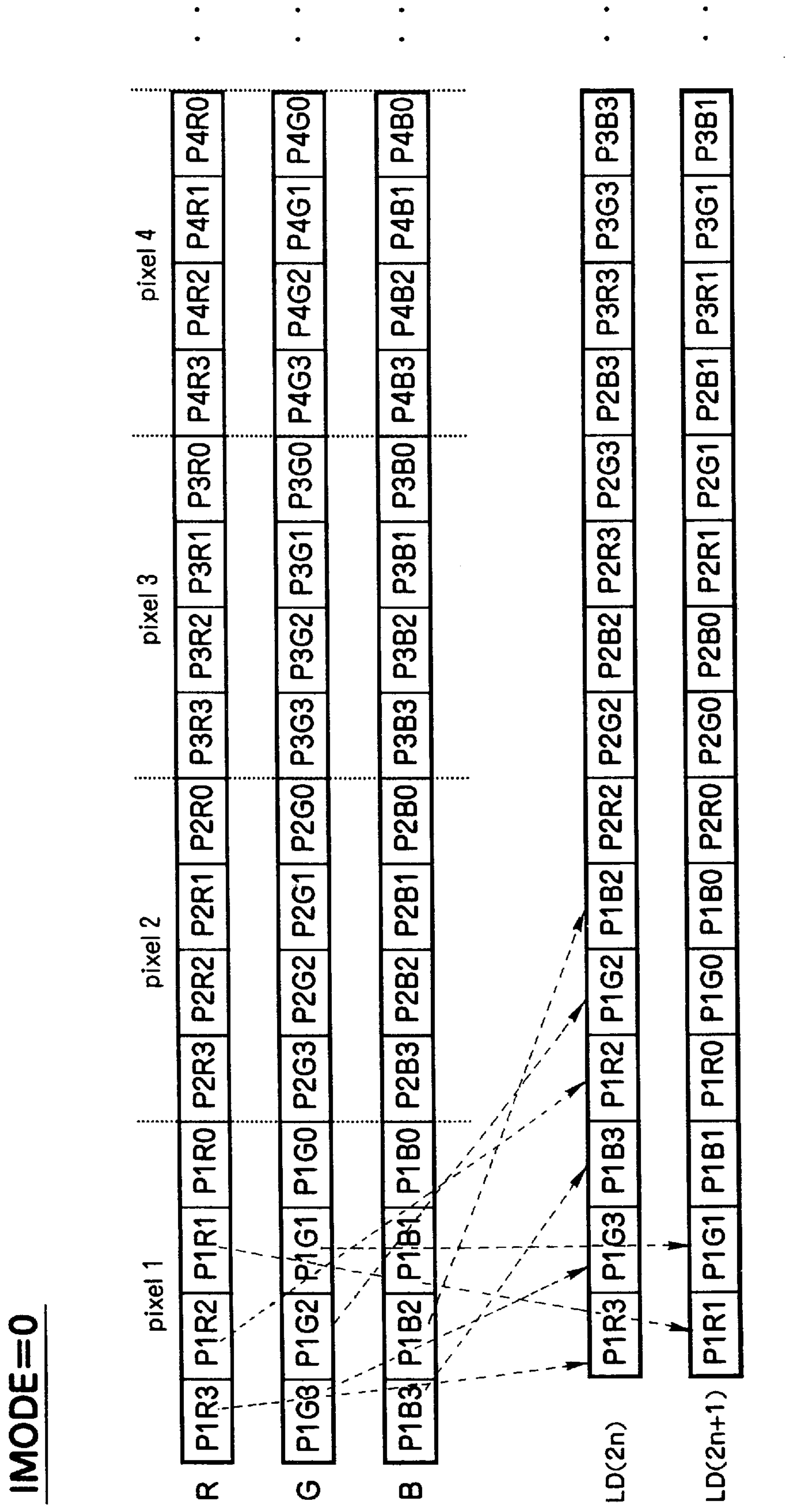
FIGS. 10A, 10B and 11 respectively illustrate a manner of processing display data for resolution conversion in the First embodiment.
Figure 10B:
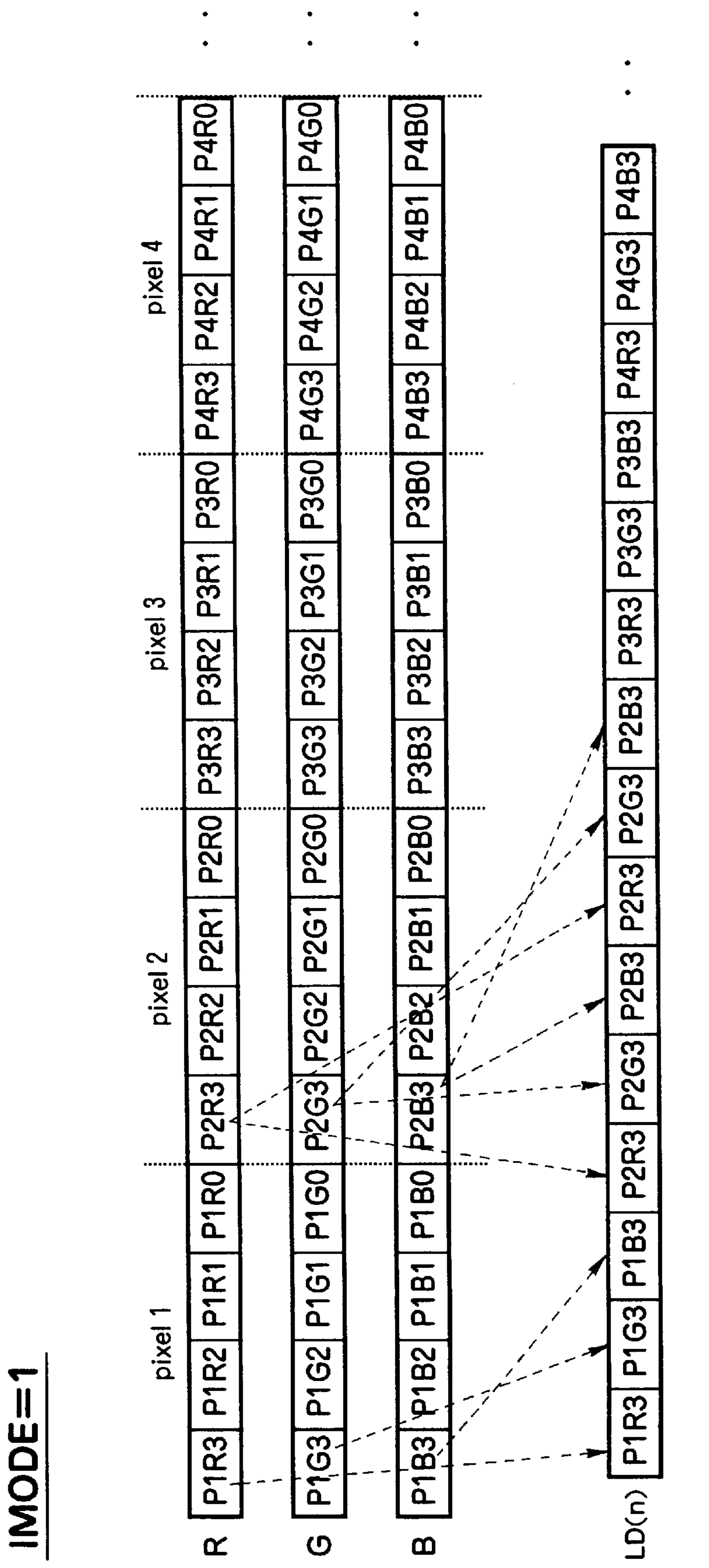
Figure 11:
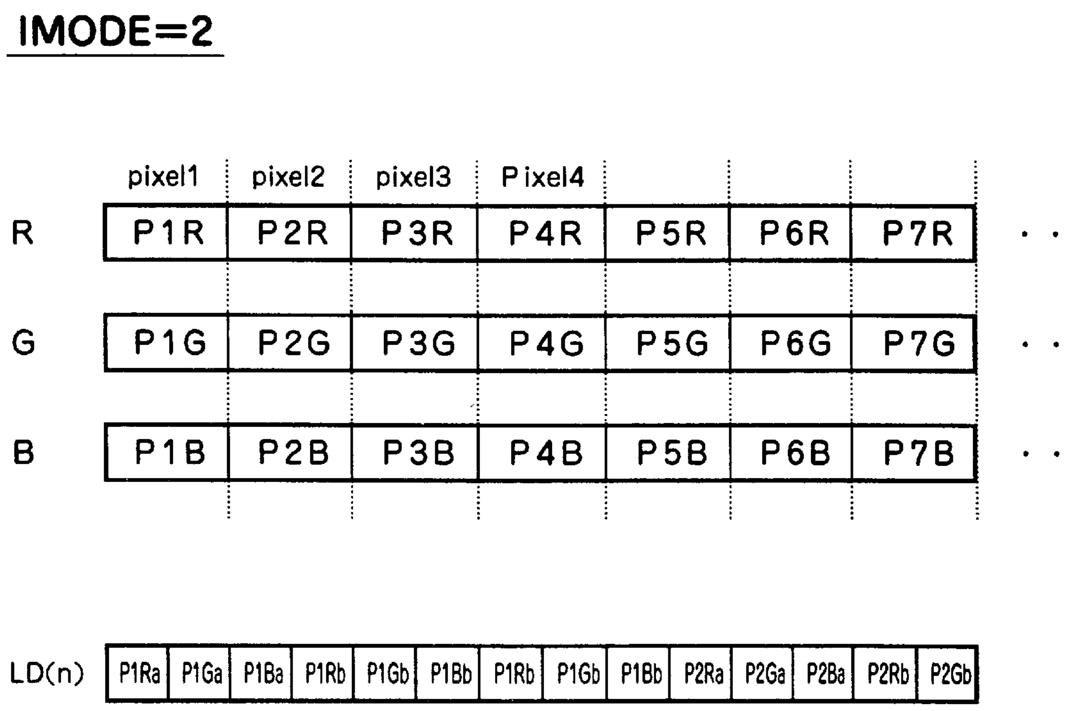

FIGS. 10 and 11 illustrate the conversion by the picture processing circuit 11 and the resultant line data. The picture processing circuit 11 effects three types of conversion according to an instruction (IMODE) from the display controller 17.

In case of IMODE=0, input data for one line is converted into two-line data LD (2n) and LD (2n+1). Upper two bits each of RGC are allotted to LD (2n) line and lower two bits each of RGB are allotted to LD (2n+1) line. In FIG. 10A, PIR3 represents bit 3 of 1st pixel R (red), and P2G1 represents bit 1 of 2nd pixel G (green).

Referring to FIG. 10B, in case of IMODE=1, upper 1 bit only of each of RGB is used to produce one line output data (LD) from one line input data. First (leftmost) picture data is allotted to upper 1 bit each of RGC once. Subsequent picture data is allotted to upper 1 bit each of RGB twice. Then, further subsequent picture data is allotted to upper 1 bit each of RGB once. Thus, output line data is formed. Allotment of respective pixels is as follows:

1st pixel (pixel 1)=RGB, 2nd pixel=RGB×2, 3rd pixel=RGB, 4th pixel=RGB, 5th pixel=RGB×2, 6th pixel=RGB . . .

Figures 12, 13:
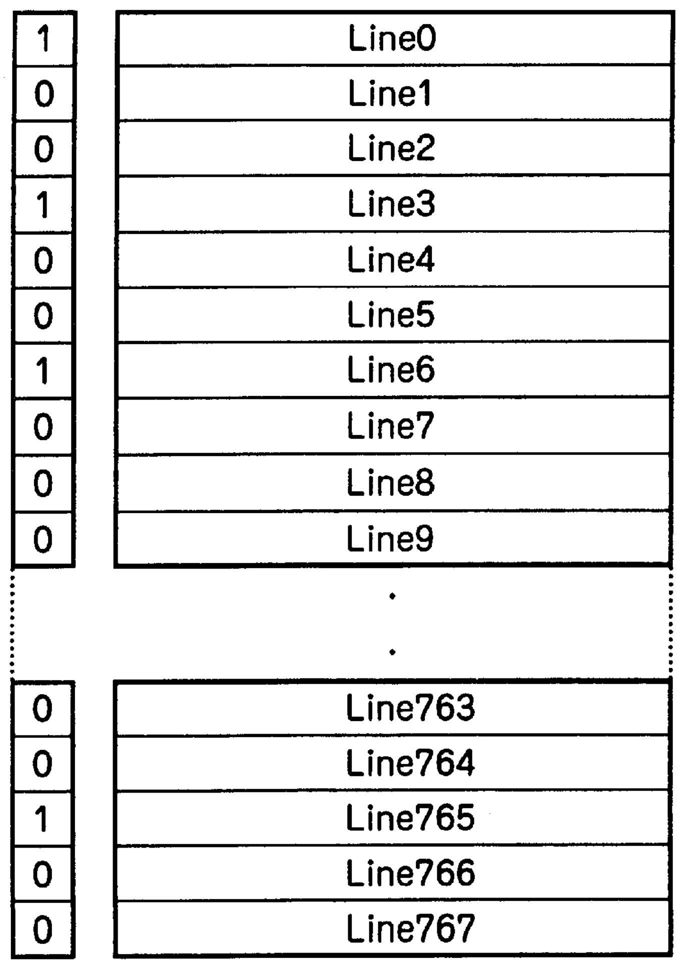
FIG. 12 shows a logic table used in the resolution conversion processing illustrated in FIG. 11.
FIG. 13 illustrates a relationship between a flag memory and scanning lines used in the First embodiment.

Referring to FIG. 11, in case of IMODE=2, all 4 bits of RGB each are used to form one-line output data (LD) from one-line input data. Each RGB data (0–15) of each pixel is converted based on a table as shown in FIG. 12 to form an output line data. INPUT shown in the table of FIG. 12 represents values for each color of each pixel (e.g., P1R in FIG. 11) and a and b in OUTPUT of FIG. 12 represent values of P1Ra and PlRb corresponding to a certain input value of P1R.

(Line output control circuit)

The line output control circuit 15 stores picture data outputted from the picture processing circuit 11 for writing into pixels on the scanning lines of the display panel in the frame memory 16, and reads out one line data from the frame memory 16 in response to FHSYNC signal supplied from the drive control circuit 20 to output picture data (PD0–15) and scanning line address data (=line numbers) corresponding to the picture data. At this time, which line of picture data should be outputted is determined by an instruction from the display controller 17.

(Operation of display controller)

The display controller 17 determines scanning lines for routine refresh scanning (=interlaced scanning) and scanning lines for partial rewriting (=non-interlaced scanning) of preferentially scanning a line having caused a change on the display panel in response to a motion detection signal (MD) from the motion detection circuit 13, and supply an instruction to the line output control circuit 15.

FIG. 13 illustrates a flag memory held within the display controller 17. The flag memory includes a number of bits each corresponding to one of the scanning lines of the display panel.

Figure 14:
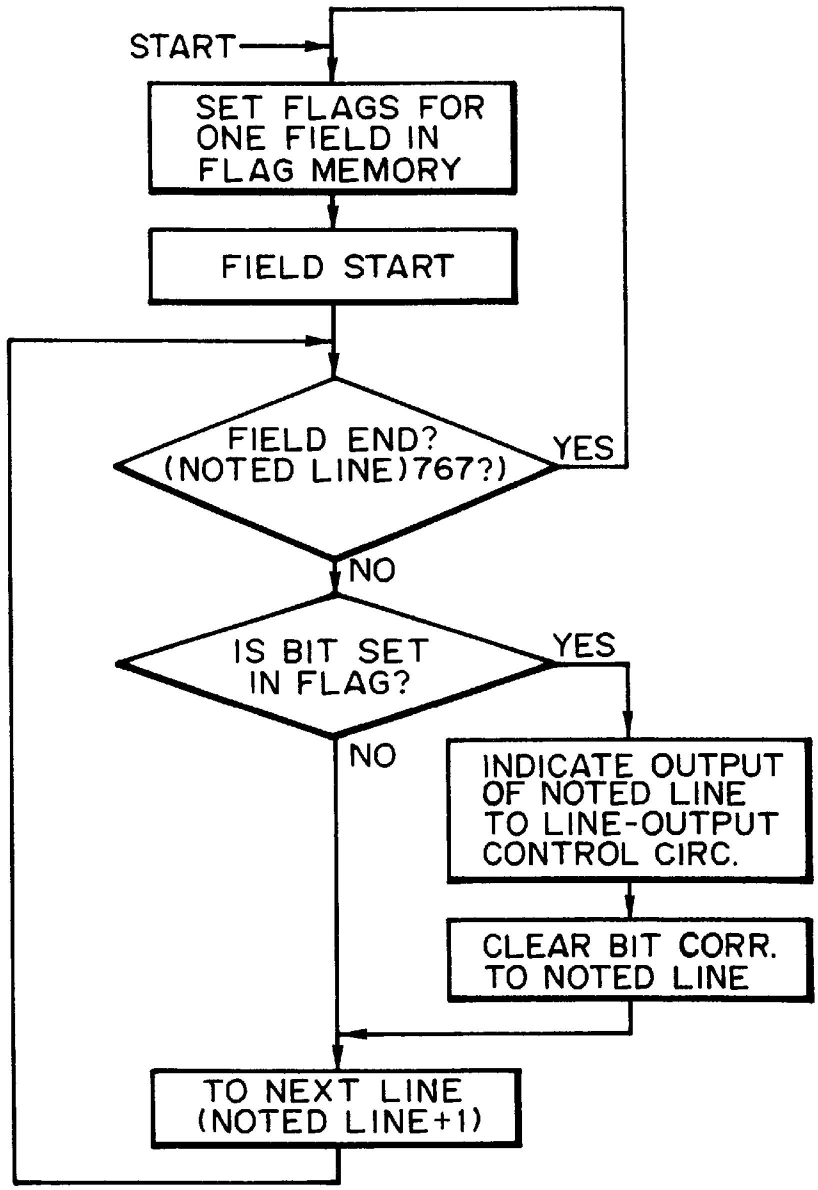
FIGS. 14 and 15 are flow charts each showing process steps of a display controller used in the First embodiment.

The display controller 17 determines a line for output along steps shown in a flow chart of FIG. 14 and instructs the line output control circuit 15. Now, the operation is described with reference to FIG. 14. First of all, the display controller 17 sets flag bits of 1 for one-field refresh scanning as shown in FIG. 13. The flag bits 1 correspond to all the scanning lines subjected to a subsequent one-field refresh scanning. For example, if the refresh scanning is performed by a three-field interlaced scanning, the scanning may be performed in the following sequence:

1st field=0, 3, 6, 9, 12, 15, 18, . . .

2nd field=1, 4, 7, 10, 13, 16, 19, . . .

3rd field=2, 5, 8, 11, 14, 17, 20, . . .

For example, at the start of the first scanning, bits corresponding to the lines 0, 3, 6, 9, 12, 15, . . . in the flag memory is set to “1”. After completing the bit setting in the flag memory, the display controller 17 inspects the content of the flag memory successively from the uppermost line (line 0) and, on finding a bit “1”, instructs the line output control circuit 15 to output data for a line corresponding to the bit.

Figure 15:
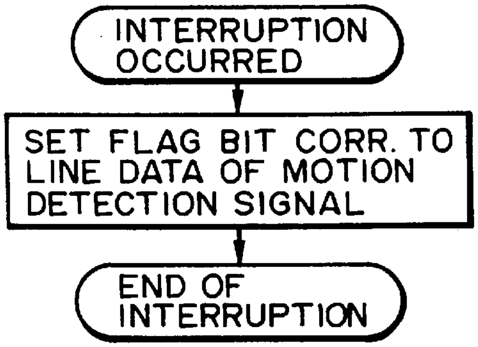

Further, on receiving a motion detection signal from the motion detection circuit 13, the display controller 17 sets internal flag bits corresponding to the relevant scanning lines according to an interruption sequence shown in FIG. 15. Accordingly, when a motion is detected from lines 10–15 as a result of the sequence shown in FIG. 14, the scanning is performed in the order of lines 0, 3, 6, 9, 10, 11, 12, 13, 14, 15 and 18, thus effecting a non-interlaced scanning instead of 3-field interlaced scanning for lines 10 to 15.

(Delay circuit, Drive control circuit)

Figure 16:
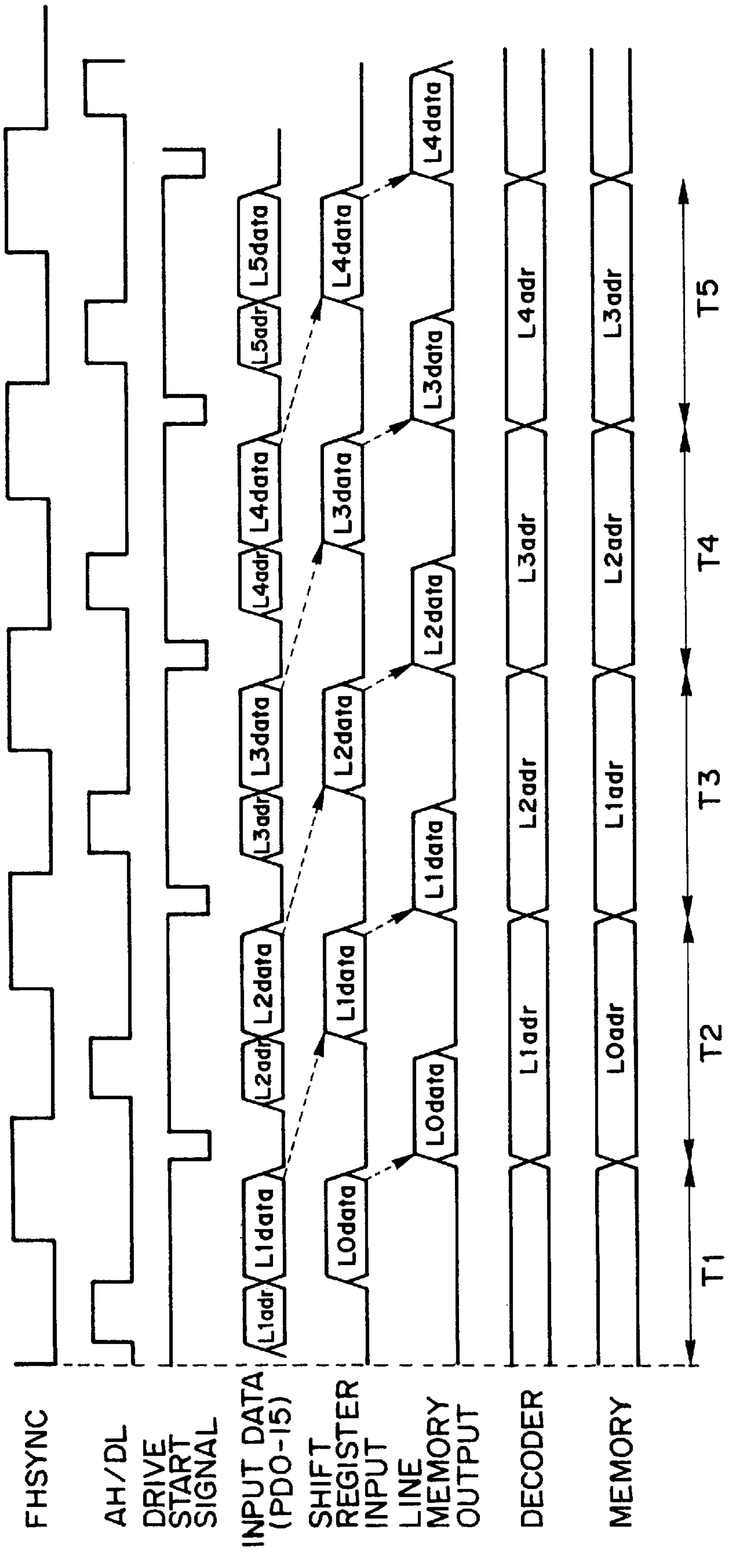
FIG. 16 is a time chart showing a time relationship among a series of operations of a line output control circuit to a display panel.

In period T1 shown in FIG. 16, the drive control circuit 20 sets FHSYNC signal at “L” level to instruct to the line output control circuit 15 that it is ready for receiving data. On detecting the fall of FHSYNC signal, the line output control circuit 15 transfers AH/LD signal and PD0–PD15 (picture data and scanning line address data) in synchronism with FCLK signal. AH/DL signal is also used as a signal for identification of picture data or scanning line address data which are both transferred through a common transmission path. PD0–PD15 transferred during a period when the AH/DL signal is at “H” level are scanning line address data and PD0–PD15 transferred during a period when the AH/DL signal is at “L” level are picture data. On receiving the AH/DL signal, the drive control circuit 20 supplies a delay enable trigger signal (DE) to the delay circuit 21 whereby only the picture data (ID) among the picture data and the scanning line address data is supplied to the delay circuit 21 in synchronism with FCLK signal. On the other hand, the address detection circuit 25 detects only the scanning line address data.

Then, the drive control circuit 20 outputs a drive start signal (ST) and latches the content of the shift register 22 in the line memory 23 and, simultaneously therewith, the scanning line address data is transferred from the address detection circuit 25 to the decoder 26 where the address data is decoded to designate lines to be cleared.

Figure 17:
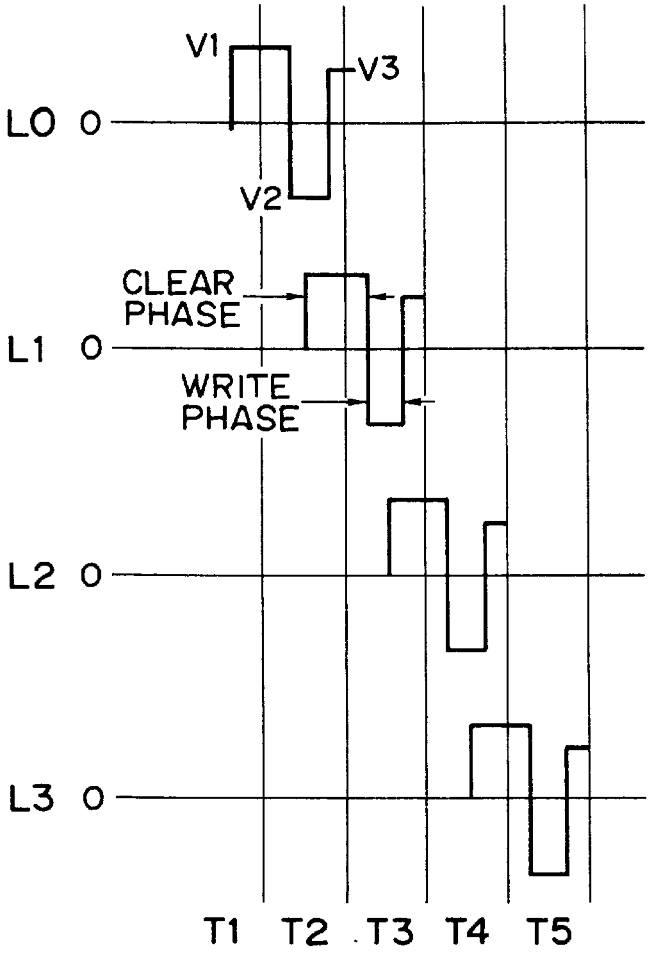
FIG. 17 is a waveform diagram illustrating sequential application scanning signals for driving a display panel of the First embodiment.
Figure 18:
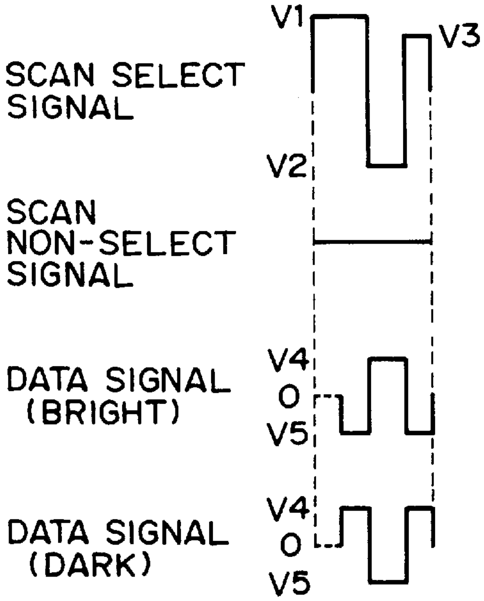
FIG. 18 is a waveform diagram showing a set of unit drive signals used in the First embodiment.

FIG. 17 illustrates a sequential application of a scanning selection to the scanning lines and FIG. 18 shows a set of drive signal waveforms applied to the scanning and data lines.

The period T1 corresponds to a 1H period (i.e., a period for rewriting one line). In a period T2, a drive is initiated by the drive start signal outputted from the drive control circuit. At this time, a scanning line (L1) designated by the decoder 26 is cleared and, simultaneously, picture data is written on a scanning line (L0) set in the memory 27. The set lines L0 and L1 are simultaneously driven by the scanning signal generation circuit 28.

At this time (T2), a voltage in "clear phase" shown in FIG. 17 is applied to the scanning line L1 and a voltage in "write phase" in FIG. 17 is applied to the scanning line L0. Incidentally, FIG. 17 shows a time sequence of applying a scanning selection signal comprising voltage peak values of V1, V2 and V3 and a scanning non-selection signal at a voltage of 0 (as shown in FIG. 18).

On the other hand, the drive control circuit 20 sets FHSYNC signal at level "L" to receive data from the line output control circuit 15 for receiving subsequent data PD0–PD15. Similarly as the above, picture data (corresponding to L2) is transferred to the delay circuit 21 and, simultaneously therewith, previous picture data (corresponding to L1) is transferred to the shift register 22. The address detection circuit 25 detects scanning line address data (corr. to L2). The drive control circuit 25 outputs a drive start signal (ST) to latch picture data (corr. to L1) in the line memory 23. Simultaneously therewith, scanning line address data (corr. to L2) is transferred to the decoder 26 and the designation of the scanning line L1 is set in the memory 27. Similarly, in period T2, the pixels on the scanning line L2 are cleared and the pixels on the scanning line L1 are rewritten into "bright" or "dark" depending on picture data (for L1) stored in the line memory 23. In this way, scanning of the display panel is continued.

(Decoder)

Figure 19:
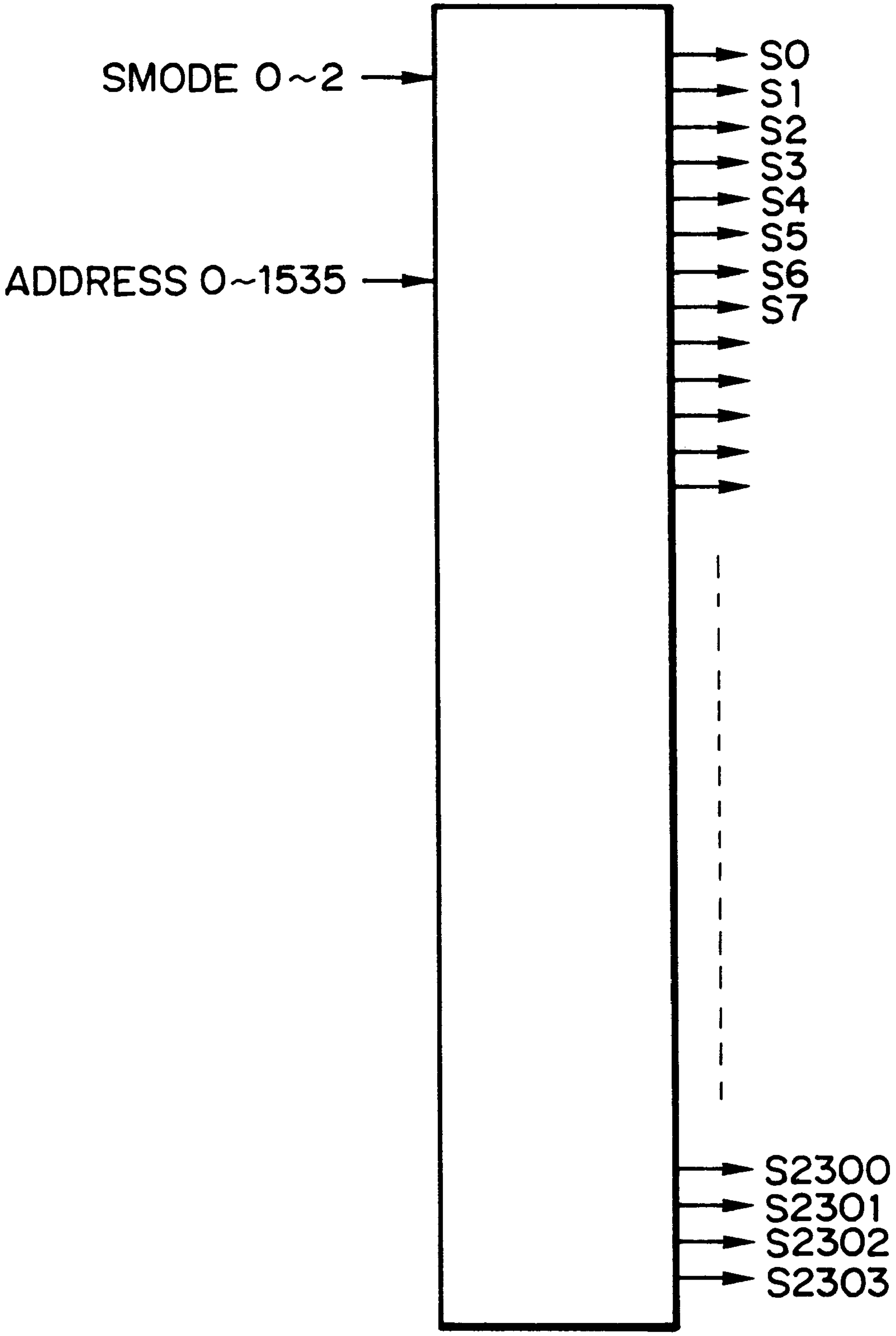
FIG. 19 illustrates a decoder organization used in the First embodiment.

FIG. 19 illustrates an internal organization of the decoder 26. The decoder converts scanning line address data designated by the address detection data 25 into selection signals (S0–11) for putting into active some circuits corresponding to scanning lines actually driven in the scanning signal generation circuit 28. Further, the decoder effects different manners of conversion depending on SMODE signal from the drive control circuit 20. FIGS. 20A, 20B and 21 illustrate the manners of conversion in cases of SMODE=0–2. The left column in each figure (table) indicates scanning line addresses inputted to the decoder, and the right column indicates correspondingly selected scanning lines. In the figure, "1" represents selection and "0" represents non-selection. For example, in case of SMODE=0 (FIG. 20A), when address=0 is inputted, S0 and S2 are "1" indicating the simultaneous selection of 0-th and 2nd scanning lines, corresponding to lines 32*a* and 32*c* in FIG. 8.

The scanning signal generation circuit 28 receives scanning selection signals supplied from both the decoder 26 and the memory 27. The circuit 28 supplies the clear phase portion of a scanning selection signal to a scanning line selected by the decoder 26 and the write phase portion of a scanning selection signal to a scanning line designated by the output of the memory 27, i.e., selected big the decoder 26 1H-period prior thereto. Further, a scanning-nonselection signal is supplied to scanning lines not selected by either of the decoder and memory outputs.

The data signal generation circuit 24 outputs two types of waveforms depending on picture data inputted from the line memory 23. For example, when a certain data line is designated as bit "1", a "bright" voltage waveform is supplied to the data line to provide a "bright" state on the display panel. On the other hand, in case of bit "0", a "dark" voltage waveform is supplied to a corresponding data line to display a "dark" state on the panel.

The following represents a relationship among DMODE signal outputted from the display mode detection circuit 14, IMODE signal supplied from the display controller 17 to the picture processing circuit 11, SMODE signal supplied from the drive control circuit 20 to the decoder 26, and OFFSET signal supplied from the display controller 17 to the line output control circuit 15.

| (Resolution of input signal) | DMODE | IMODE | SMODE | OFFSET |
|---|---|---|---|---|
| H = 1024, V = 768 | 0 | 0 | 0 | X = 0, Y = 0 |
| H = 1536, V = 1152 | 2 | 1 | 2 | X = 0, Y = 0 |
| H = 768, V = 576 | 1 | 2 | 1 | X = 0, Y = 0 |
| H = 640, V = 480 | 3 | 2 | 1 | X = 64, Y = 48 |
| . | | | | |
| . | | | | |
| . | | | | |

Figure 22:
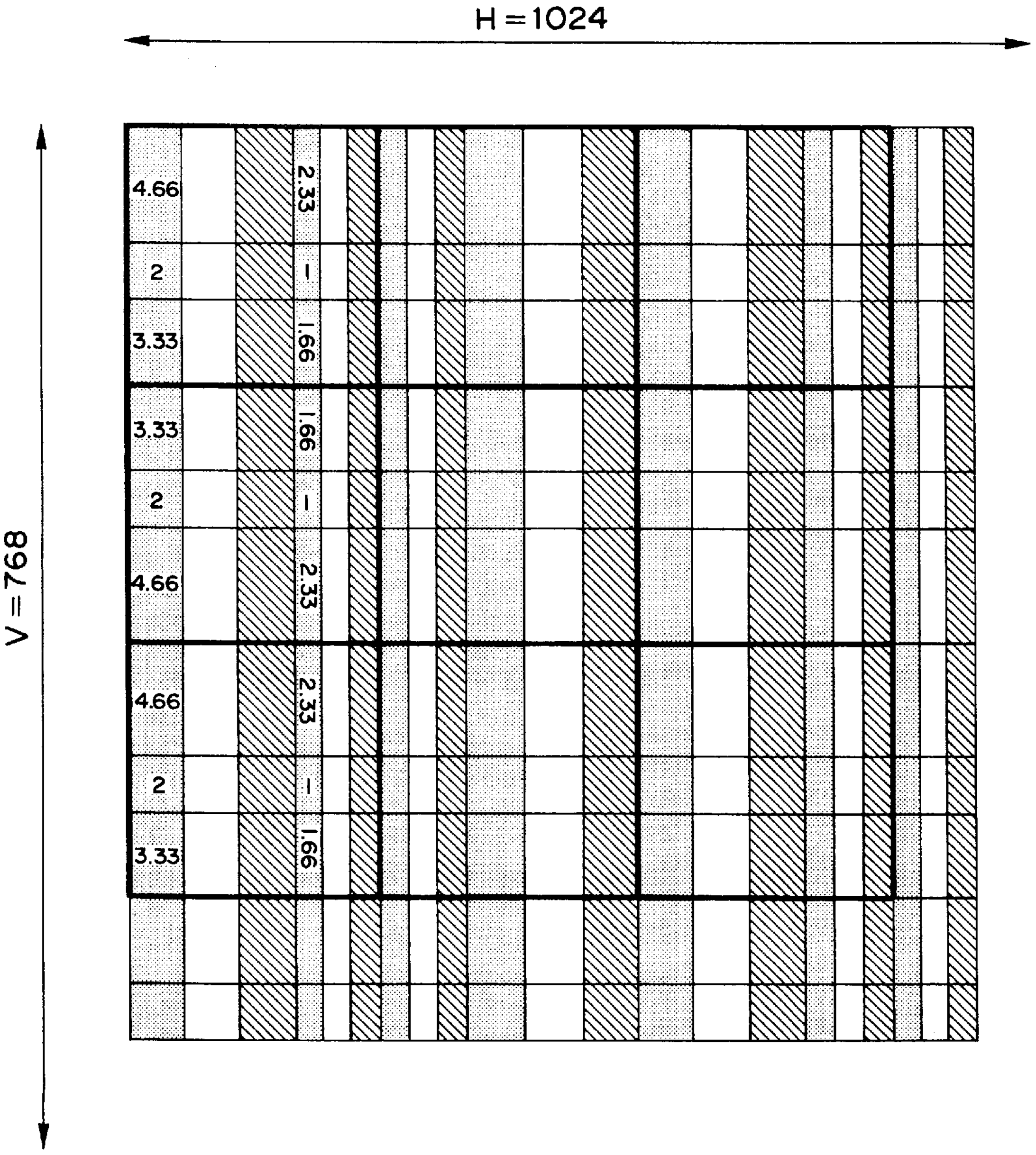
FIG. 22 illustrates pixel units for display at a certain resolution of the display panel in First embodiment.
Figure 23:
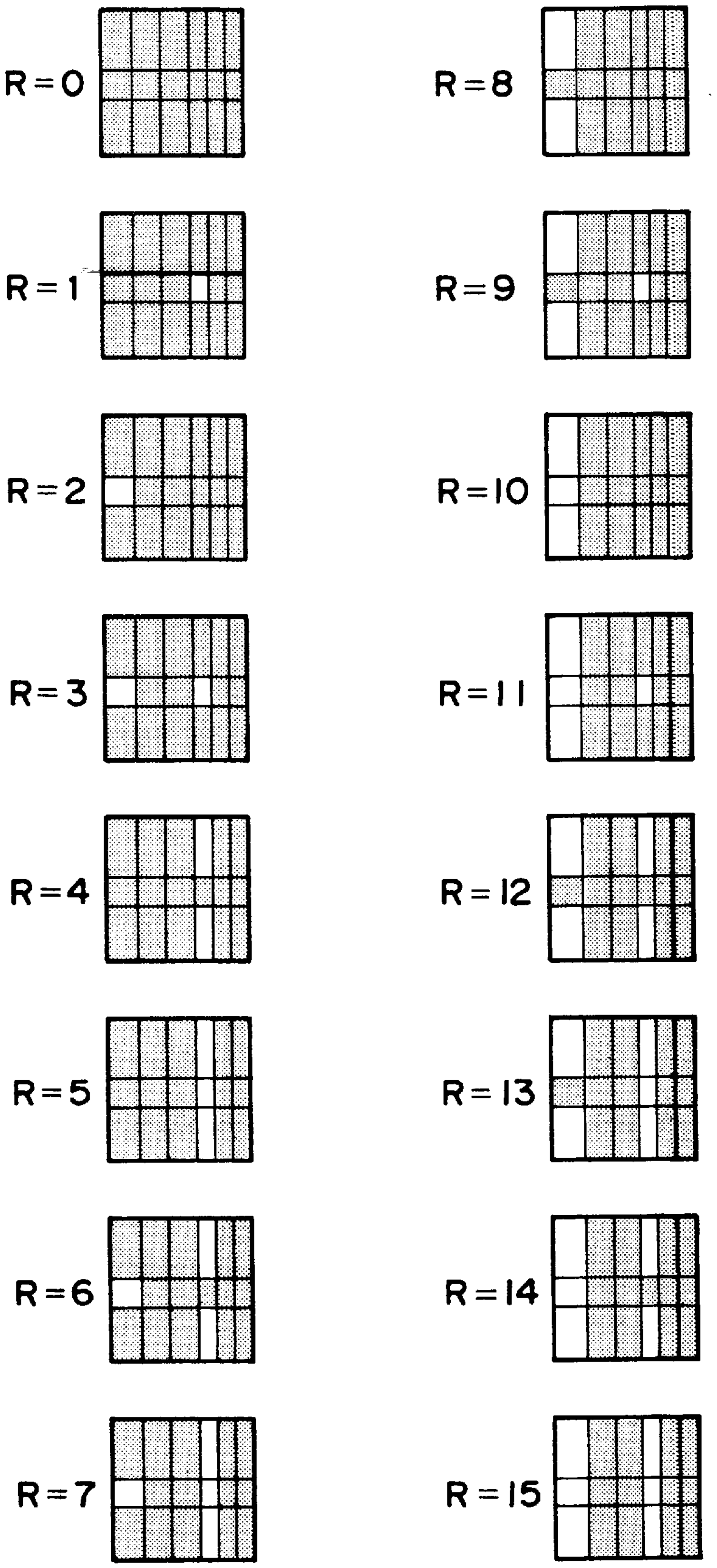
FIG. 23 illustrates a manner of gradational display at the gradation shown in FIG. 22.

Hereinbelow, a display operation of the display apparatus according to the present invention will be described for a case of a host computer issuing a resolution signal of H=1024 and V=768. From a time of receiving the signal, the display mode detection circuit 14 outputs a signal of DMODE=0. On receiving the signal, the display controller 17 outputs IMODE=0 to the picture processing circuit 11, which effects picture data conversion as illustrated in FIG. 10A, whereby two lines of data are outputted from one line of inputted data. On the other hand, the drive control circuit 20 outputs SMODE=0 to the decoder 26, which outputs a scanning selection signal. FIG. 22 shows a region corresponding to one pixel of the display panel 30 at this time. Each pixel is constituted so as to be able to display 16 gradation levels of R0–R15 as shown in FIG. 23 for each of RGB colors (=totally 4096 colors).

Figure 24:
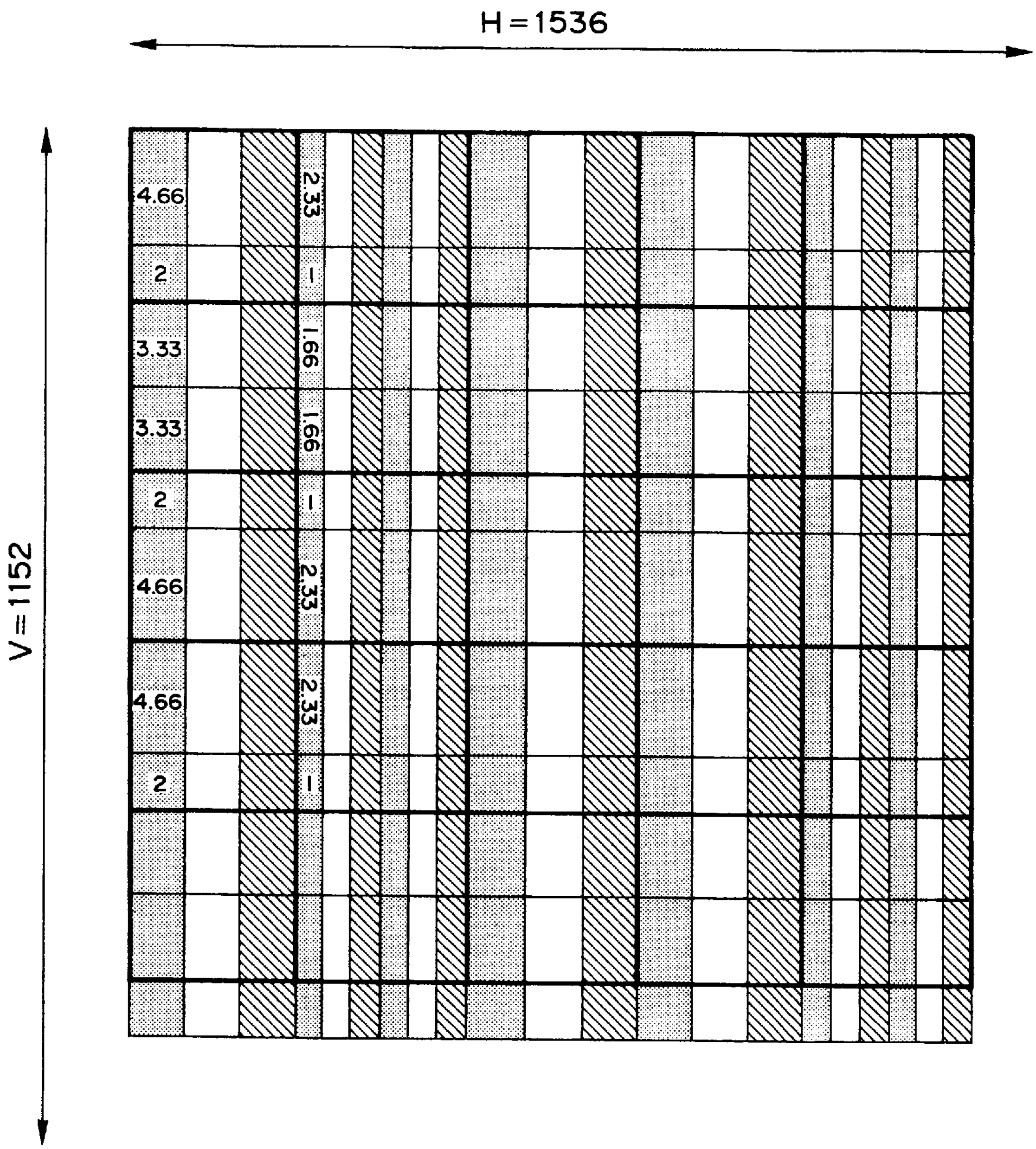
FIGS. 24 and 26 respectively illustrate pixel units for display at another resolution of the display panel in the First embodiment.

Then, in the case of the host computer issuing a resolution signal of H=1536 and V=1152, from the instant of receiving the signal, the display mode detection circuit 14 outputs a signal of DMODE=2. On receiving the signal, the display controller 17 outputs IMODE=1 to the picture processing circuit 11, which effects picture data conversion as illustrated in FIG. 10B, whereby one line of data is outputted from one line of inputted data. On the other hand, the drive control circuit 20 outputs SMODE=2 to the decoder 26, which outputs a scanning selection signal. FIG. 24 shows a region corresponding to one pixel of the display panel 30 at this time. Each pixel is constituted so as to be able to display 2 gradation levels as shown in FIG. 25 for each of RGB colors (=totally 8 colors).

Figure 26:
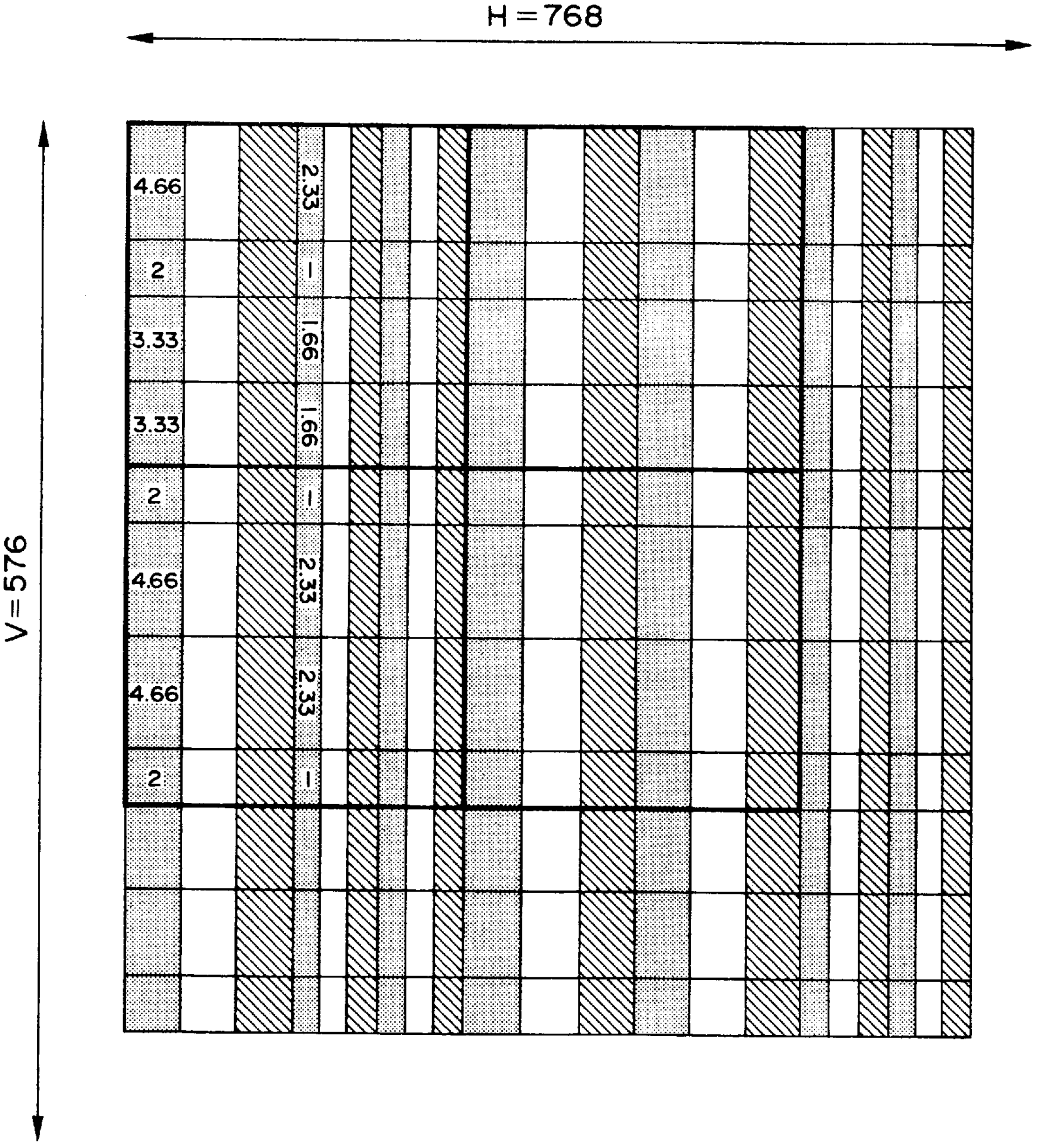
Figure 27A:
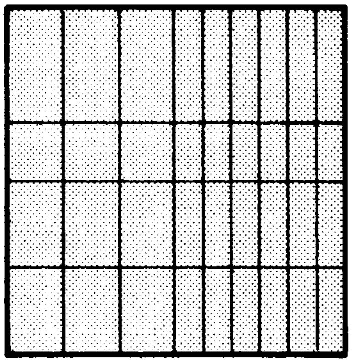
Figure 27B:
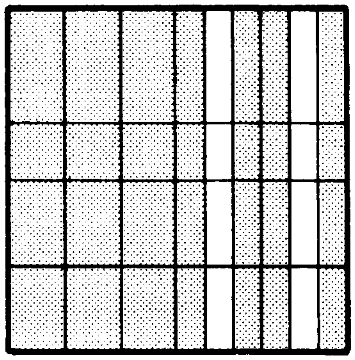
Figure 27C:
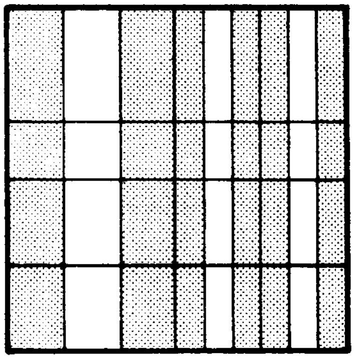

Then, in the case of the host computer issuing a resolution signal of H=768 and V=576, from the instant of receiving the signal, the display mode detection circuit 14 outputs a signal of DMODE=1. On receiving the signal, the display controller 17 outputs IMODE=2 to the picture processing circuit 11, which effects picture data conversion as illustrated in FIG. 11, whereby one line of data is outputted from one line of inputted data. On the other hand, the drive control circuit 20 outputs SMODE=1 to the decoder 26, which outputs a scanning selection signal. FIG. 26 shows a region corresponding to one pixel of the display panel 30 at this time. Each pixel is constituted so as to be able to display 3 gradation levels as shown in FIG. 27 for each of RGB colors (=totally 27 colors).

Further, also in the case of the host computer issuing a resolution signal of H=640 and V=480, the mode signals are DMODE=1, IMODE=2 and SMODE 1. In this case, the picture is not displayed over the entire display panel. However, in the operation of storing picture data in the frame memory 16, the line output control circuit 15 effects the storage with a point of X=64 and Y=48 as the upper left corner on the frame memory in response to OFFSET signal, whereby the picture is displayed at the center of the display panel.

It is also possible to provide a further preferred embodiment by changing an arrangement of (sub-)dots of respective colors along a longitudinal direction of scanning lines as shown in FIG. 3.

The above description merely refers to an embodiment of the present invention. For example, in view of the essential nature of the present invention, the present invention does not depend on the number of colors to be displayed.

As described above, according to the present invention, a display apparatus including a single matrix-type display panel can be supplied with picture signals at plural resolutions while changing one pixel size in response to an inputted resolution level, so that it becomes possible to display a clear picture with panel pixels having a 1:1 correspondence with pixels of inputted picture data while obviating conventional difficulties such as a reduction in display area and blurring or non-naturalness due to interpolation or thinning-out, always over the entire display panel or in a size close to that of the display panel. Further, not only a multi-color display is possible, but also a multi-level gradational display can be effected by using sub-dots.

What is claimed is:

1. A display apparatus comprising:

a color display panel; and drive means for driving said color display panel, wherein said color display panel comprises a multiplicity of pixels each comprising a first color dot comprising a plurality of sub-dots having mutually different areas and a second color dot comprising a plurality of sub-dots having mutually different areas, wherein each of the first and second color dots comprises at least one first sub-dot and at least one second sub-dot having an effective area smaller than that of the first sub-dot, and the first or second sub-dot of the second color dot is disposed between the first and second sub-dots of the first color dot; and said drive means for the display panel includes data signal supply means for, in a high-resolution display mode, supplying data signals corresponding to date for one pixel among original picture data selectively to either one of the first and second sub-dots, and in a low-resolution display mode, supplying data signals corresponding to the data for one pixel to both the first and second sub-dots.

2. A display apparatus according to claim 1, with each pixel further including a third color dot comprising a plurality of sub-dots having mutually different areas.

3. A display apparatus according to claim 2, wherein the first to third color dots are in red, green and blue, respectively.

4. A display apparatus according to claim 1, wherein each sub-dot has an area defined by a light-interrupting member and a color filter.

5. A display apparatus according to claim 1, wherein each sub-dot is caused to have a display state determined by a combination of voltages applied to a scanning line and a data line associated with the sub-dot.

6. A display apparatus according to claim 1, wherein each sub-dot assumes an optical state of either bright or dark.

7. A display apparatus according to claim 1, wherein said display panel is a liquid crystal display panel using a liquid crystal.

8. A display apparatus according to claim 1, wherein said display panel is a liquid crystal display panel using a nematic liquid crystal showing two metastable states.

9. A display apparatus according to claim 1, wherein said display panel is a liquid crystal display panel using a chiral smectic liquid crystal.

10. A display apparatus according to claim 1, wherein each pixel further includes a third color dot comprising at least one first sub-dot are at least one second sub-dot having an effective area smaller than that of the first sub-dot.

11. A display apparatus according to claim 10, wherein the first or second sub-dots of the third color dot is further disposed between the first and second sub-dots of the first color dot.

12. A display apparatus according to claim 10, wherein the second sub-dot of the second color dot is disposed between the first sub-dot of the first color dot and the first sub-dot of the third sub-dot, and the first sub-dot of the second color dot is disposed between the second sub-dot of the third color dot and the first sub-dot of the second color dot.

13. A display apparatus according to claim 10, wherein each color dot further includes third and fourth sub-dots each having an effective area different from either of the effective areas of the first and second sub-dots, and the third and fourth sub-dots are disposed on columns on which the first and second sub-dots, respectively, are disposed.

14. A display apparatus according to claim 13, wherein the first and second sub-dots of each color dot are disposed on a common scanning line, and the third and fourth sub-dot of the color dots are disposed on another common scanning line.

15. A display apparatus according to claim 13, wherein each color dot further includes fifth and sixth sub-dots each having an effective area different from any of the effective areas of the first to fourth sub-dots.

16. A display apparatus according to claim 15, wherein the first and second sub-dots of each color dot are disposed on a first scanning line, the third and fourth sub-dots of the color dot are disposed on a second scanning line, and the fifth and fourth sub-dots of the color dot are disposed on a third scanning line.

17. A display apparatus according to claim 16, wherein the first, third and fifth sub-dots of each color dot are disposed on a first data line, and the second, fourth and sixth sub-dots of the color dot are disposed on a second data line.

18. A display apparatus according to claim 16, wherein said first and third sub-dots are simultaneously selected.

19. A display apparatus according to claim 13, wherein the first sub-dot has an effective area which is twice that of the second sub-dot for each color dot.

20. A display apparatus according to claim 1, wherein the first sub-dot of the first color dot is disposed adjacent to the second sub-dot of the second color dot.

21. A display apparatus according to claim 1, wherein the first sub-dot of the first color dot is disposed on a column, on which is provided a third sub-dot of the first color dot having an effective area different from either of the effective areas of the first and second sub-dots.

22. A display apparatus according to claim 1, wherein the first and second sub-dots of the first color dot and the first and second sub-dots of the second color dot are disposed on a common scanning line.

23. A display apparatus, comprising:

a color display panel; and drive means for driving said color display panel, wherein said color display panel comprises a multiplicity of pixels each comprising a first color dot comprising a plurality of sub-dots having mutually different areas and a second color dot comprising a plurality of sub-dots having mutually different areas; wherein each of the first and second color dots comprises at least one first sub-dot and at least one second sub-dot having an effective area smaller than that of the first sub-dot, and the first or second sub-dot of the second color dot is disposed between the first and second sub-dots of the first color dot; and said drive means for said color display panel includes data signal supply means for, in a first gradation display mode, supplying data signals corresponding to data for one pixel among original picture data selectively to either one of the first and second sub-dots, and in a second gradation display mode for displaying a larger number of gradation levels than in the first gradation display mode, supplying data signals corresponding to the data for one pixel to both the first and second sub-dots.

24. A display apparatus according to claim 23, with each pixel further including a third color dot comprising a plurality of sub-dots having mutually different areas.

25. A display apparatus according to claim 24, wherein the first to third color dots are in red, green and blue, respectively.

26. A display apparatus according to claim 23, wherein each sub-dot has an area defined by a light-interrupting member and a color filter.

27. A display apparatus according to claim 23, wherein each sub-dot is caused to have a display state determined by a combination of voltages applied to a scanning line and a data line associated with the sub-dot.

28. A display apparatus according to claim 23, wherein each sub-dot assumes an optical state of either bright or dark.

29. A display apparatus according to claim 23, wherein said display panel is a liquid crystal display panel using a liquid crystal.

30. A display apparatus according to claim 23, wherein said display panel is a liquid crystal display panel using a nematic liquid crystal showing two metastable states.

31. A display apparatus according to claim 23, wherein said display panel is a liquid crystal display panel using a chiral smectic liquid crystal.

32. A display apparatus according to claim 23, wherein each pixel further includes a third color dot comprising at least one first sub-dot and at least one second sub-dot having an effective area smaller than that of the first sub-dot.

33. A display apparatus according to claim 32, wherein the first or second sub-dots of the third color dot is further disposed between the first and second sub-dots of the first color dot.

34. A display apparatus according to claim 32, wherein the second sub-dot of the second color dot is disposed between the first sub-dot of the first color dot and the first sub-dot of the third sub-dot, and the first sub-dot of the second color dot is disposed between the second sub-dot of the third color dot and the first sub-dot of the second color dot.

35. A display apparatus according to claim 32, wherein each color dot further includes third and fourth sub-dots each having an effective area different from either of the effective areas of the first and second sub-dots, and the third and fourth sub-dots are disposed on columns on which the first and second sub-dots, respectively, are disposed.

36. A display apparatus according to claim 35, wherein the first and second sub-dots of each color dot are disposed on a common scanning line, and the third and fourth sub-dots of the color dot are disposed on another common scanning line.

37. A display apparatus according to claim 35, wherein each color dot further includes fifth and sixth sub-dots each having an effective area different from any of the effective areas of the first to fourth sub-dots.

38. A display apparatus according to claim 37, wherein the first and second sub-dots of each color dot are disposed on a first scanning line, the third and fourth sub-dots of the color dot are disposed on a second scanning line, and the fifth and fourth sub-dots of the color dot are disposed on a third scanning line.

39. A display apparatus according to claim 38, wherein the first, third and fifth sub-dots of each color dot are disposed on a first data line, and the second, fourth and sixth sub-dots of the color dot are disposed on a second data line.

40. A display apparatus according to claim 38, wherein said first and third sub-dots are simultaneously selected.

41. A display apparatus according to claim 35, wherein the first sub-dot has an effective area which is twice that of the second sub-dot for each color dot.

42. A display apparatus according to claim 23, wherein the first sub-dot of the first color dot is disposed adjacent to the second sub-dot of the second color dot.

43. A display apparatus according to claim 23, wherein the first sub-dot of the first color dot is disposed on a column, on which is provided a third sub-dot of the first color dot having an effective area different from either of the effective areas of the first and second sub-dots.

44. A display apparatus according to claim 23, wherein the first and second sub-dots of the first color dot and the first and second sub-dots of the second color dot are disposed on a common scanning line.

* * * * *

UNITED STATES PATENT AND TRADEMARK OFFICE

CERTIFICATE OF CORRECTION

PATENT NO. : 5,920,299

DATED : July 6, 1999

INVENTOR(S): MASAMICHI OHSHIMA, ET AL. Page 1 of 2

It is certified that error appears in the above-identified patent and that said Letters Patent is hereby corrected as shown below:

Title page, item
[56] REFERENCES CITED:

U.S. PATENT DOCUMENTS, insert the following:

| | | | |
|---|---|---|---|
| --5,543,819 | 11/1993 | Farwell et al. ......... | 345/150 |
| 5,317,437 | 7/1992 | Katakura ............... | 359/87 |
| 5,438,442 | 3/1994 | Katakura ............... | 359/54 |
| 5,298,915 | 6/1992 | Bassetti, Jr. .......... | 345/149 |
| 5,157,524 | 9/1989 | Dijon et al. ........... | 359/54--. |

COLUMN 8:

Line 4, "(RGE)," should read --(RGB),--.

COLUMN 9:

Line 2, "disp ay" should read --display--.
Line 11, ""threshold," should read --"threshold,"--.

COLUMN 14:

Line 36, "sub-dot" should read --sub-dots--.

UNITED STATES PATENT AND TRADEMARK OFFICE

CERTIFICATE OF CORRECTION

PATENT NO. : 5,920,299

DATED : July 6, 1999

INVENTOR(S): MASAMICHI OHSHIMA, ET AL.

It is certified that error appears in the above-identified patent and that said Letters Patent is hereby corrected as shown below:

COLUMN 16:

Line 4, "sub-dots" should read --sub-dot--.

Signed and Sealed this

Twentieth Day of March, 2001

Nicholas P. Godici

Attest:

NICHOLAS P. GODICI

*Attesting Officer* *Acting Director of the United States Patent and Trademark Office*